US012282415B2

(12) United States Patent
Daunais et al.

(10) Patent No.: US 12,282,415 B2
(45) Date of Patent: Apr. 22, 2025

(54) QA RUN CYCLE AND REPORT GENERATION SYSTEM

(71) Applicant: Oracle International Corporation, Redwood Shores, CA (US)

(72) Inventors: Michael Brian Daunais, Burlington, MA (US); Srinivas Rao Vardhineni, Hyderabad (IN); Sivaji Nallagorla, Guntur (IN); Lakshmi Anuradha Venkata Garimella, Hyderabad (IN); Santhosh Konduru, Balapur Mandal (IN); Dilli Babu Jonnagaddala, Andhra Pradesh (IN); Anil Amunabolu, Karnataka (IN)

(73) Assignee: Oracle International Corporation, Redwood Shores, CA (US)

( * ) Notice: Subject to any disclaimer, the term of this patent is extended or adjusted under 35 U.S.C. 154(b) by 154 days.

(21) Appl. No.: 17/848,186

(22) Filed: Jun. 23, 2022

(65) Prior Publication Data

US 2023/0418727 A1 Dec. 28, 2023

(51) Int. Cl.
*G06F 9/44* (2018.01)
*G06F 9/445* (2018.01)
(Continued)

(52) U.S. Cl.
CPC ...... *G06F 11/3664* (2013.01); *G06F 11/3612* (2013.01); *G06F 11/3692* (2013.01)

(58) Field of Classification Search
CPC ............ G06F 11/3664; G06F 11/3612; G06F 11/3692
See application file for complete search history.

(56) References Cited

U.S. PATENT DOCUMENTS 10,459,835 B1 * 10/2019 George ................. G06F 16/906
11,327,874 B1 *  5/2022 Klein .................. G06F 11/3692
(Continued)

FOREIGN PATENT DOCUMENTS

CN          114020317 A  *  2/2022  .......... G06F 11/3672

OTHER PUBLICATIONS

John Wiley, From SDLC to Agile—Processes and Quality, 2018, pp. 635-665. https://ieeexplore.ieee.org/xpl/ebooks/bookPdfWithBanner.jsp?fileName=8343605.pdf&bkn=8340186&pdfType=chapter (Year: 2018).*

(Continued)

*Primary Examiner* — Mongbao Nguyen
(74) *Attorney, Agent, or Firm* — Hickman Becker Bingham Ledesma LLP

(57) ABSTRACT

Techniques for providing a QA run cycle and report generation system are provided. In one technique, a user interface (UI) tool retrieves first software testing result data that was generated based on a first type of software test of a software build. The UI tool also retrieves second software testing result data that was generated based on a second type of software test of the software build. In response to receiving first input that selects the first software testing result data, the UI tool updates a UI to present first data that is based on a portion of the first software testing result data. In response to receiving the second input that selects the second software testing result data, the UI tool updates the UI to present second data that is based on a portion of the second software testing result data.

20 Claims, 19 Drawing Sheets

(51) Int. Cl.
  *G06F 9/455* (2018.01)
  *G06F 11/36* (2006.01)
  *G06F 11/3604* (2025.01)
  *G06F 11/3668* (2025.01)

(56) References Cited

U.S. PATENT DOCUMENTS

| | | | | |
|---|---|---|---|---|
| 11,860,768 | B1* | 1/2024 | Bansal | G06F 11/3466 |
| 2010/0268502 | A1* | 10/2010 | Jayasudha | G06F 11/3672 |
| | | | | 702/82 |
| 2017/0344467 | A1* | 11/2017 | Yadav | G06F 11/3664 |
| 2018/0157584 | A1* | 6/2018 | Forbes | G06F 11/3692 |
| 2019/0196946 | A1* | 6/2019 | Budhai | G06F 11/3692 |
| 2019/0294531 | A1* | 9/2019 | Avisror | G06F 11/3692 |
| 2021/0133091 | A1* | 5/2021 | Pillai | G06F 11/3604 |
| 2021/0405976 | A1* | 12/2021 | Gaitonde | G06F 11/3664 |
| 2022/0269583 | A1* | 8/2022 | Plawecki | G06F 8/70 |
| 2022/0309418 | A1* | 9/2022 | Chivukula | G06F 8/71 |
| 2022/0334959 | A1* | 10/2022 | Wang | G06F 11/3684 |
| 2022/0382236 | A1* | 12/2022 | Mereddy | G05B 19/0426 |
| 2023/0195596 | A1* | 6/2023 | Mazumdar | G06F 11/3612 |
| | | | | 717/131 |
| 2023/0315614 | A1* | 10/2023 | Freitag | G06F 11/3616 |
| 2023/0393963 | A1* | 12/2023 | Mangat | G06N 20/00 |

OTHER PUBLICATIONS

Gaobo Sun, Research on a Component Testing Tool Supporting Data Integrity Verification, 2019, pp. 477-482. https://ieeexplore.ieee.org/stamp/stamp.jsp?tp=&arnumber=8725781 (Year: 2019).*

Asma J. Abdulwareth, Toward a Multi-Criteria Framework for Selecting Software Testing Tools, 2021, pp. 158872-158890. https://ieeexplore.ieee.org/stamp/stamp.jsp?tp=&arnumber=9614194 (Year: 2021).*

English translation, Zhang (CN 114020317 A), Feb. 2022. (Year: 2022).*

Saja Khalid Alferidah, Automated Software Testing Tools, 2020, pp. 1-4. https://ieeexplore.ieee.org/stamp/stamp.jsp?tp=&arnumber=9213735 (Year: 2020).*

Nor Shahida Mohamad Yusop, Reporting Usability Defects: A Systematic Literature Review, 2017, pp. 848-865. https://ieeexplore.ieee.org/stamp/stamp.jsp?tp=&arnumber=7779159 (Year: 2017).*

Anushka Lal, Intelligent Testing in Software Industry, 2021, pp. 1-6. https://ieeexplore.ieee.org/stamp/stamp.jsp?tp=&arnumber=9580012 (Year: 2021).*

* cited by examiner

FIG. 4B

APIs transaction time report for Sprints and Drops

| API No | Request Type | End point | Description |
|---|---|---|---|
| 1 | POST | https://<<host>>:<<port>/cxpapis/v1/catalogs | Create Catalog |
| 2 | GET | https://<<host>>:<<port>/cxpapis/v1/catalogs/<<catalogID>> | Get Catalog |
| 3 | PATCH | https://<<host>>:<<port>/cxpapis/v1/catalogs/<<catalogID>> | Update Catalog |
| 4 | POST | https://<<host>>:<<port>/cxpapis/v1/categories | Create Category |
| 5 | GET | https://<<host>>:<<port>/cxpapis/v1/categories/<<categoryID>> | Get Category |
| 6 | PATCH | https://<<host>>:<<port>/cxpapis/v1/categories/<<categoryID>> | Update Category |
| 7 | POST | https://<<host>>:<<port>/cxpapis/v1/items | Create Item |
| 8 | GET | https://<<host>>:<<port>/cxpapis/v1/items/<<itemID>> | Get Item |
| 9 | PATCH | https://<<host>>:<<port>/cxpapis/v1/items/<<itemID>> | Update Item |

492

| API No | Description |
|---|---|
| 1 | Create Catalog |

| Sprint | Drop | Transaction time (in milliseconds) |
|---|---|---|
| Sprint5 | Drop1 | |
| Sprint6 | Drop2 | 2 |

CX Apps Environment's Status Report 9-May-2022-3-53-0

| DEV | QA | PM |
|---|---|---|
| person1@oracle.com | person2@oracle.com | person3@oracle.com |

| App Type | Product | Owner | URL | Up/Down | Login Det |
|---|---|---|---|---|---|
| CX | Field Service (TOA) (Manage URL) | QA | https://web-master.ofsctev.oci.oc-test.com/kzresoley/ | Up | UserName:CXQA_User,Pass |
| CX | Field Service (TOA) (Mobility URL) | QA | https://lp-master.ofsctev.oci.oc-test.com/kzredevmobility/ | Up | UserName:CXQA_User,Pass |
| CX | Field Service (TOA) (Manage URL) | QA | https://lp-master.ofsctev.oci.oc-test.com/kzosml | Up | UserName:CXQA_User,Pass |
| CX | Field Service | | | | |

*FIG. 6*

QA RUN CYCLE AND REPORT GENERATION SYSTEM

BACKGROUND

Software projects have a high failure rate. The causes of this failure rate are well-understood and well documented by industry analysts. Many software projects fail to meet the expectations of those who funded the project, those who are expected to benefit from the project, and those who contributed to the project. Many corporate teams do a poor job of communicating and managing the many factors associated with software projects, such as requirements, builds, deployments, API and performance testing, automation testing, defect management, risks, and dependencies. Furthermore, disjointed information about a software project is scattered across different data sources, such as Wiki pages, confluence pages, cross team collaboration platforms, source repositories, and excel spreadsheets. Different parties who are interested in a software project include developers, managers, QA personnel, VPs, and executives. Each of these parties typically have visibility (if at all) into a small part of the software project, whether due to limited access or to limited familiarity with each data source. Unfortunate consequences of such siloing of information include a lack of clarity in execution strategy, a lack of coordination, and a lack of discipline.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIGS. 4A-4B are screenshots of example user interfaces for navigating defect information, in an embodiment;

FIG. 4E is a screenshot of an example user interface that includes information about different API calls that a software build makes when executed, in an embodiment;

FIG. 6 is a screenshot of an example user interface provided by the QD for viewing information about applications upon which a software project depends, in an embodiment;

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

A system and method for initiating a QA run cycle and presenting reports that result therefrom are provided. In one technique, a user interface tool triggers the build of a software package, the running of multiple types of tests of the software package, the conversion of result data of those tests into a particular format, and a user interface for navigating the different test results in the particular format. The different types of software tests may be performed by different software testing tools. Nevertheless, the user interface tool allows any user thereof to view the results of each of the software tests along with other helpful information pertaining to a software project.

Embodiments improve computer-related technology pertaining to software development. Embodiments address core causes of software project failure, which addressing increases the likelihood of project success. Embodiments allow multiple users to have a 360 degree view into the entire life cycle of a software engineering project. Not only do embodiments build a software package, they deploy the software package as well. Once deployment is successful, embodiments execute testing for each sprint, which may comprise multiple drops. Results of the testing is made visible through the user interface tool. Embodiments allow all members of a software development team to contribute to, and be current on, the growing information system that is an enterprise software project. Embodiments do not require individuals or organizations to change their existing processes. Rather, embodiments allow the same information-related tasks to be performed more efficiently and effectively. Embodiments allow information and changes to that information to be updated, communicated, and distributed more quickly in a rich project-specific context. Embodiments blend into existing processes (rather than imposing process) and enhance them with the aid of software. Embodiments provide value by increasing the efficiency and accuracy of project-related communication between employees and between departments. Embodiments create a reusable knowledge-base that continuously provides value as subsequent software projects build on the success of previous software projects. Embodiments allow organizations to use a digital assistant knowledge-base as a valuable training and knowledge retention tool, limiting the negative effects of employee turnover and transfer engineering.

Design Flow Overview

Figure 1:
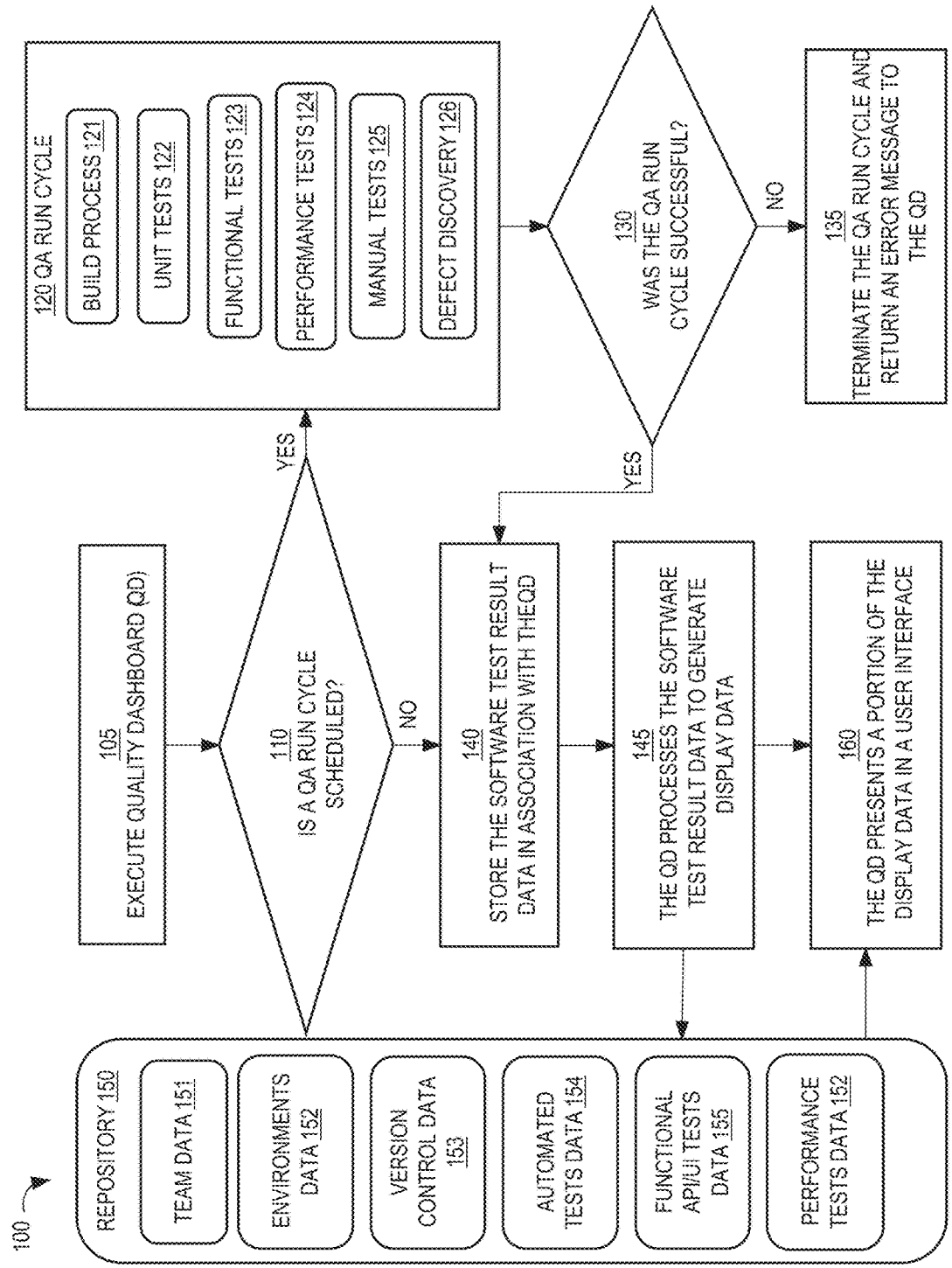
FIG. 1 is a block diagram that depicts an example design flow pertaining to a user interface tool, in an embodiment.

FIG. 1 is a block diagram that depicts an example design flow 100 pertaining to a user interface tool, in an embodiment. The user interface tool that generates report data pertaining to software tests and defects and provides a user interface for navigating the corresponding reports resulting from those software tests. The user interface tool is implemented in software or a combination of software and hardware. The user interface tool may execute entirely on a computing device, such as a desktop computer or laptop computer. Alternatively, a portion of the user interface tool may execute remotely on a server computer and another portion of the user interface tool may execute on a client computer, such as a laptop computer. For example, the user interface tool may have a web server component and a web application component that executes within a web browser (that executes on a client computer), that receives user input, that communicates or transmits that user input to the web server component (e.g., over the Internet or other computer network), that receives data from the web server component, and that displays the data on a screen of the client computer. Hereafter, "user interface tool" and "Quality Dashboard" are used interchangeably.

At block 105, the Quality Dashboard (QD) is executed. Block 105 may be triggered by the running of a particular shell or bat script. Block 105 may be preceded by a step of cloning the Quality Dashboard executable from a certain storage location, such as a Git repository.

At block 110, it is determined whether a quality assurance (QA) run cycle is to be initiated. Block 110 may involve QD determining whether a shell or bat script indicates a QA cycle or whether a QA schedule is indicated in a particular data source. For example, a user may have specified, in QA schedule data, that a QA cycle should be run at a certain time on a certain day. If that certain time has arrived and a QA cycle has not yet been run since that time, then the determination is in the affirmative.

If the determination of block 110 is in the affirmative, then flow 100 proceeds to block 120; otherwise, flow proceeds to block 130.

Block 120 is a QA run cycle that comprises multiple steps, including a build process 121, running one or more unit tests 122, running one or more functional automation tests 123, running one or more performance tests 124, running one or more manual tests 125, and defect discovery 126. Build process 121 results in the generation of one or more files, such as JAR files. The different types of tests 122-125 are run against those files. A unit test tests functionality of a unit of the software build. The unit's purpose in the overall software project may be to perform a certain function or set of functions and may be called by one or more other units in the software build. A functional automation test tests the interactions between units, such as whether certain APIs of a unit are callable by other users and whether the proper data is being sent and/or returned as a result of API calls. A performance test measures how fast certain operations or requests take to complete and/or how much data is being consumed and/or transferred as a result of execution of certain execution paths through a software build. A defect is manually created and logged as a result of one of the above types of tests. For example, an API is not working or is not returning an expected value. In this case, an automated test would fail, indicating in the QD as a failure. Then that test case is evaluated to see if it is a defect; if so, a bug report is opened manually.

Block 120 may involve the QD calling an API of a service that is separate from the QD. An example of the service is Jenkins™, which is an open source automation server that helps automate parts of software development related to building, testing, and deploying, facilitating continuous integration and continuous delivery. Jenkins is a server-based system that runs in servlet containers, such as Apache Tomcat. In response to the QD calling the service, the service calls one or more other software tools that perform the different types of software testing. Such calling of the other software tools may be based on a (shell or bat) script that the service runs in response to the API call from the QD.

At block 130, it is determined whether the QA run cycle was successful. Block 130 may be performed by an entity that is different than the QD. A QA run cycle may fail if one or more of the tests did not run successfully (e.g., based on changes to an API, UI, or process flow) or if the build was not deployment successfully due to, for example, additional steps required for new functionality. If block 130 is in the negative, then flow 100 proceeds to block 135; otherwise, flow 100 proceeds to block 140.

At block 135, the QA run cycle is terminated and an error message is returned to the QD. The QD may present the error message in a user interface of the QD. The error message may include data about what specifically failed, such as which test did not run.

At block 140, software test result data is stored in association with the QD. For example, the software test result data may be stored in a software package of the QD. Therefore, the QD accesses the software test result data from the software package. As another example, the software test result data may be stored at one or more locations that are external to the software package but that are known to the QD.

The software test result data includes result data from different types of software tests, such as performance tests and unit tests.

Block 140 may involve a computer process automatically storing the software test result data produced by running the QA cycle, may involve a user manually selecting the software test result data at a location that is accessible to the QD, or may involve a combination of both techniques.

At block 145, the QD processes the software test result data to generate display data. The display data is in a different format than the software test result data. Block 145 may involve running a shell or bat script that is part of a software package associated with the QD. The display data is stored in a repository 150, which may be volatile or non-volatile storage. The script may use JIRA APIs to fetch test cases and defects. The script may also retrieve automation/performance test results from logs of runs on an external system. Alternatively, instead of utilizing a script, block 145 may involve placing test cases, defects, and test results manually. Repository 150 includes data about a team 151 responsible for the software project that is being test, data about environments 152, data about version control 153, data about automated tests 154, data about functional API/UI tests 155, and data about performance tests 156, each of which is described in more detail herein.

Additionally or alternatively, block 145 may involve generating one or more intermediate forms of the result data before the display data is generated. For example, if some of the software test result data is in a CSV (comma-separated values) format, then the QD generates, based on the CSV data, result data in a JSON (JavaScript Object Notation) format, and then generates, based on the JSON data, display data in a table format. In an implementation, the QD uses a simple JSON API to generate JSON data from CSV data. Also, in an implementation, the QD uses Angular JS (JavaScript) to generate table data from JSON data.

At block 160, the QD presents a portion of the display data (found in repository 150) in a user interface. The portion may be a subset of the available display data. The user interface includes one or more user interface controls for navigating the display data. Example user interface controls include selectable links, graphical buttons that are associated with certain actions and/or links to other data, drop down menus, radio buttons, and text fields for searching among the presented display data. The portion of the display data that is presented may be based on user input that selects that portion. The user interface controls may include a menu for selecting (and presenting) other portions of the display data, such as data about functional API/UI tests 154 and data about performance tests 155.

In an implementation, the QD uses HTML (Hypertext Markup Language) and CSS (Cascading Style Sheets) to present the display data in the user interface. Also, in an implementation, the QD uses JavaScript to display and process the display data based on actions initiated through the user interface.

Navigation Panel

Figure 2:
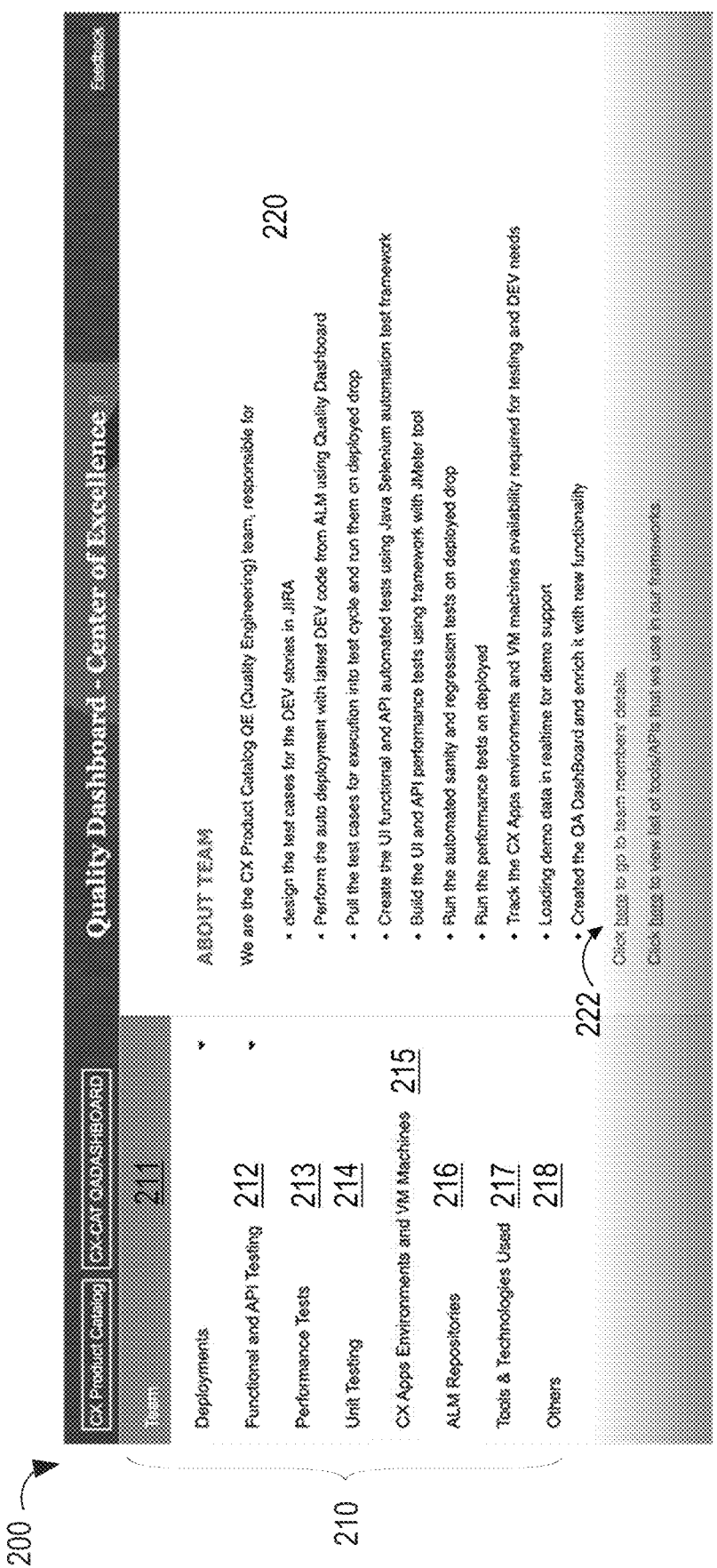
FIG. 2 is a screenshot of an example main page of a user interface of the user interface tool ("Quality Dashboard" or "QD"), in an embodiment.

FIG. 2 is a screenshot of an example main page 200 of a user interface of the QD, in an embodiment. Main page 200 includes a navigation panel 210 that includes selectable options that allow the user (interacting with the QD) to navigate through all the information available through the QD. The selectable options include:
a. a team option 211 that, when selected, causes the user interface to be updated to include information about a software development team responsible for a software project;
b. a functional and API testing option 212 that, when selected, causes the user interface to be updated to include information about such testing pertaining to the software project;
c. a performance tests option 213 that, when selected, causes the user interface to be updated to include information about performance tests pertaining to one or more builds of the software project;
d. a unit tests option 214 that, when selected, causes the user interface to be updated to include information about unit testing pertaining to one or more builds of the software project;
e. an environments option 215 that, when selected, causes the user interface to be updated to include information about environments pertaining to the software project;
f. an ALM repositories option 216 that, when selected, causes the user interface to be updated to include information about repositories pertaining to application lifecycle management (ALM) of the software project;
g. a tools and technologies used option 217 that, when selected, causes the user interface to be updated to include information about tools and technologies used in development of the software project;
h. an others option 218 that, when selected, causes the user interface to be updated to include information about miscellaneous information, pertaining to the software project, that is not closely enough related to the other options in navigation panel 210.

Team Details

In the example screenshot of FIG. 2, team option 211 is selected. This may be a default selection when the QD is first generated, loaded, and the user interface thereof is presented on a screen of a user's computing device, such as a desktop computer, a laptop computer, or a smartphone. Main page 200 includes a main panel 220 that includes information pertaining to the selectable option, in side panel 210, that is currently selected, whether selected by the user or by default. In this example, because team option 211 is selected, main panel 220 includes information about the software team. In this specific example, main panel 220 includes a link 222 that, if selected, causes the user interface to be updated to include (e.g., main panel 220 to be replaced with) details about each member of the software team. Example details include, for each team member, first name, last name, contact information (e.g., email address), and a globally-unique identifier (GUID).

Functional and API Tests

Figure 3A:
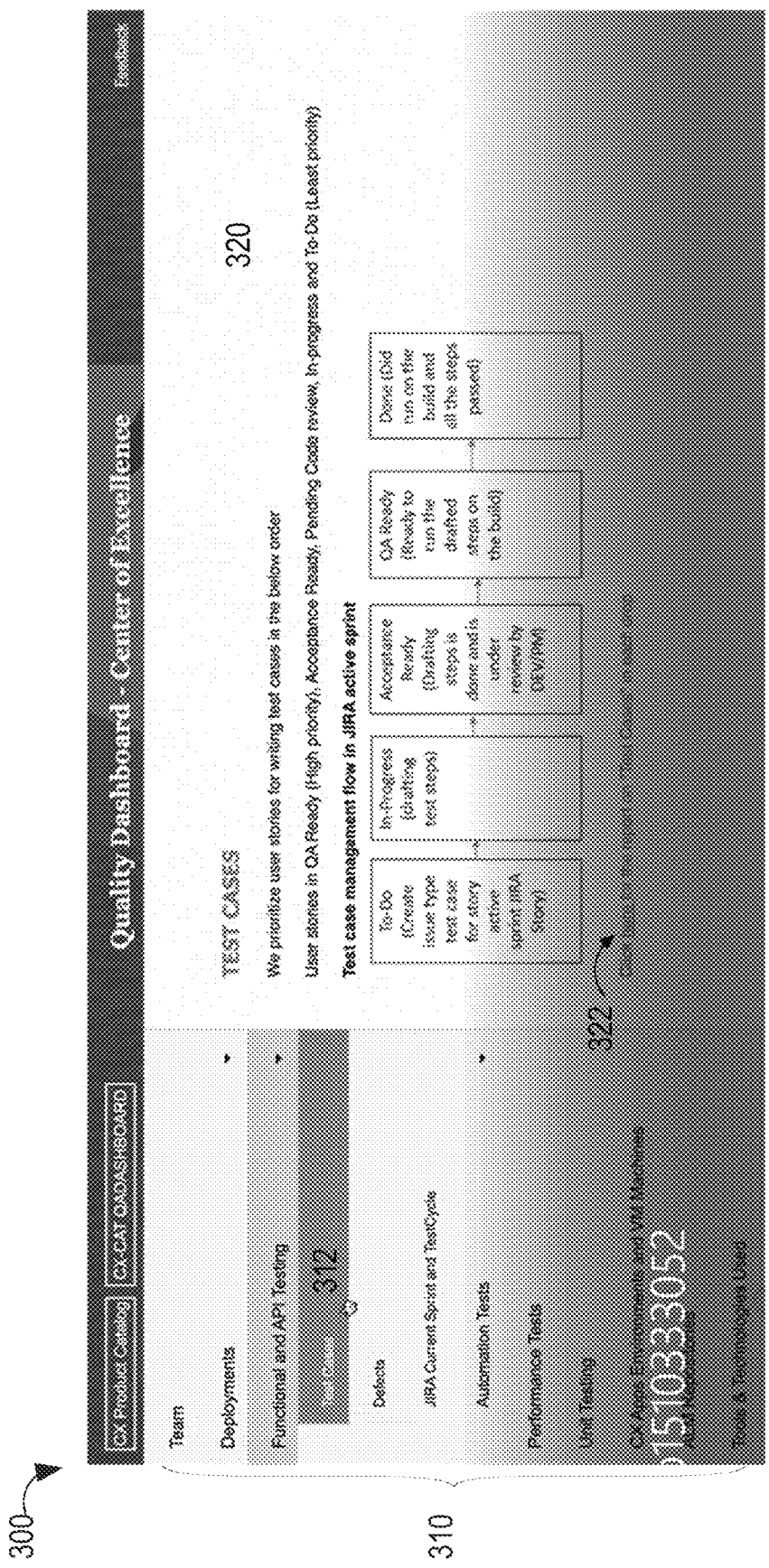
FIGS. 3A-3B are screenshots of example user interfaces for navigating test information, in an embodiment.

FIG. 3A is a screenshot of an example user interface 300 for navigating test information, in an embodiment. User interface 300 may be generated in response to selection of functional and API testing option 212 and selection of a test cases option 302, which is one of multiple sub-options of functional and API testing option 212. User interface 300 includes a navigation panel 310 and a main panel 320 that describes a test case management flow and includes a link 322 that, when selected, causes the QD to replace user interface 300 with a user interface 350 in FIG. 3B.

Figure 3B:
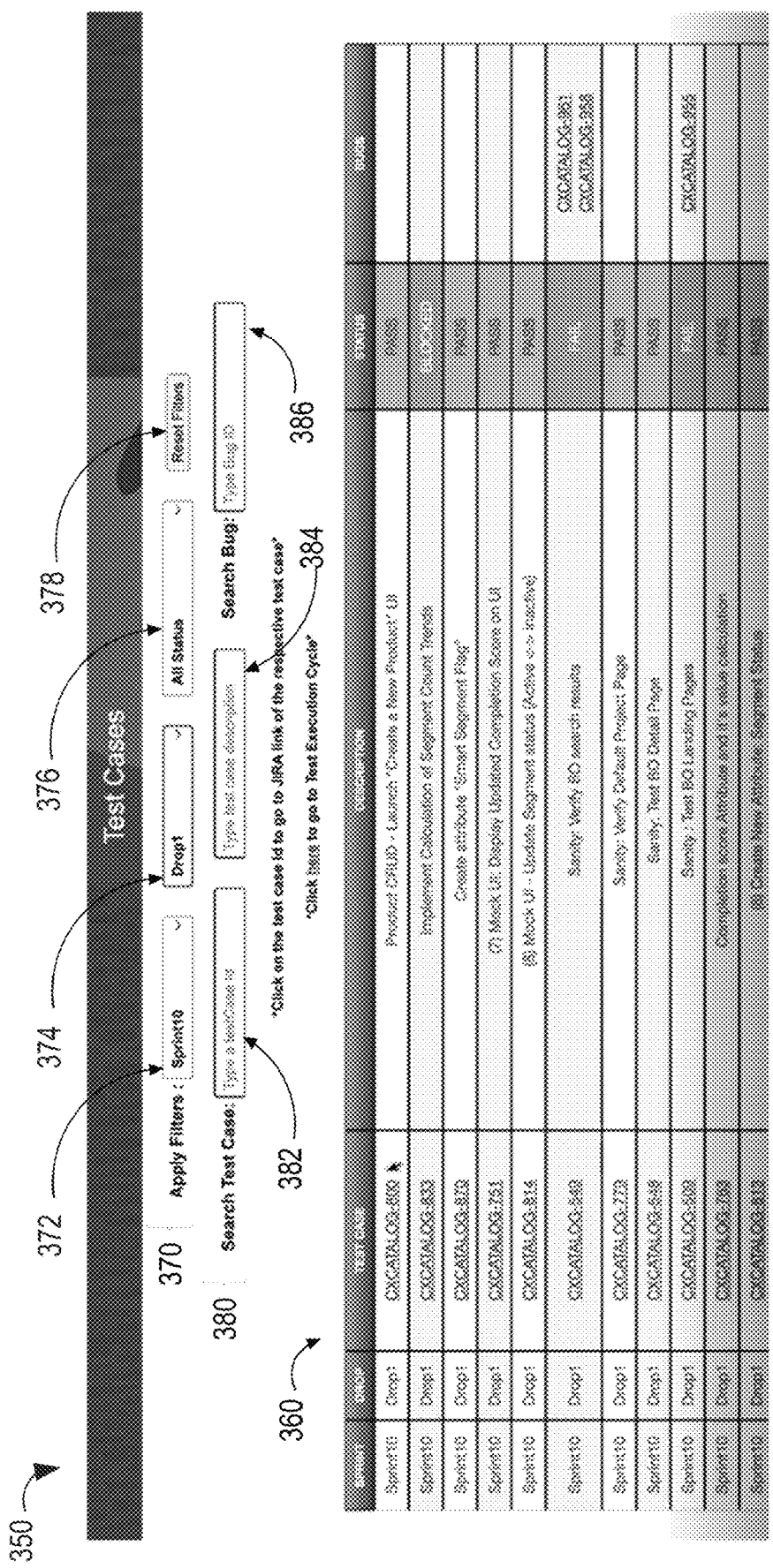

FIG. 3B is a screenshot of user interface 350 that lists details about multiple test cases, in an embodiment. In this example, user interface 350 comprises a table 360, where each row corresponds to a different test case and columns include a sprint identifier, a drop identifier, a test case identifier, a description of the test case, a status of the test case (e.g., pass, fail, work-in-progress (WIP), or blocked), and a bug report.

In the examples described herein, a specific build is a combination of a sprint and a drop. A sprint is a period of time (e.g., 15 days) and a drop within a sprint corresponds to a particular build. Each sprint is uniquely identified, in this example with an incrementing number. Thus, sprint 2 occurs after sprint 1. Each drop within a sprint is also numbered, restarting at 1 for each sprint. Thus, sprint 3, drop 2 indicates a particular build of a software project that occurred before a build corresponding to sprint 4, drop 1. Other implementations may utilize a different numbering system or character-based system to identify specific builds.

Figure 3C:
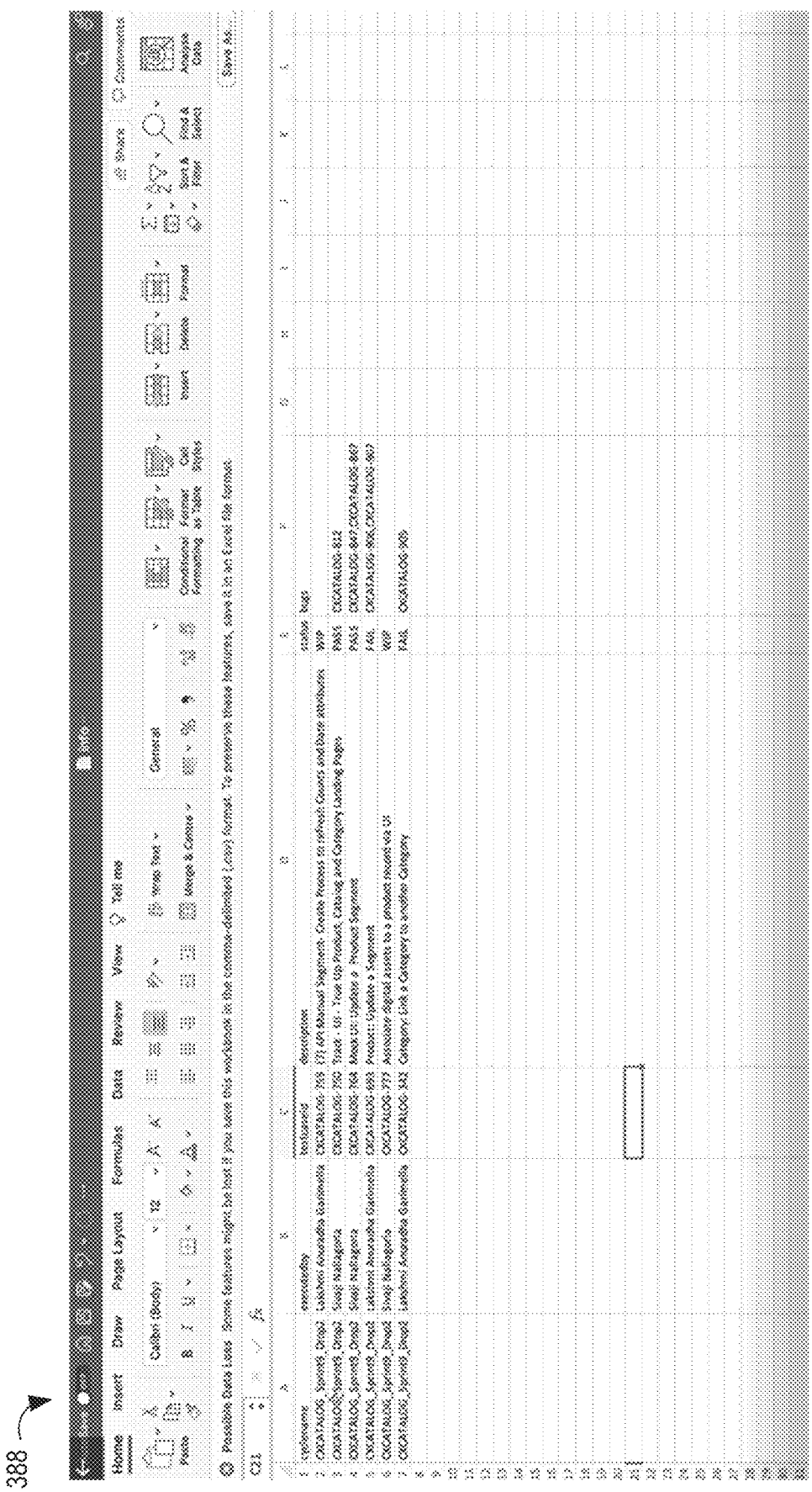
FIG. 3C is a screenshot of an example CSV file, in an embodiment.

Table 360 may be based on data in a CSV file, such as example CSV file 388 in FIG. 3C. In that file, each row corresponds to a different test case and attributes of each test case include a build identifier (or cycle name), a person who initiated or executed the test case, a test case ID, a description of the test case, a status of the test case, and a bug ID if a bug report is available. Table 360 may be updated based on a search that is executed against a JSON file that was generated based on an original CSV file.

Figure 3D:
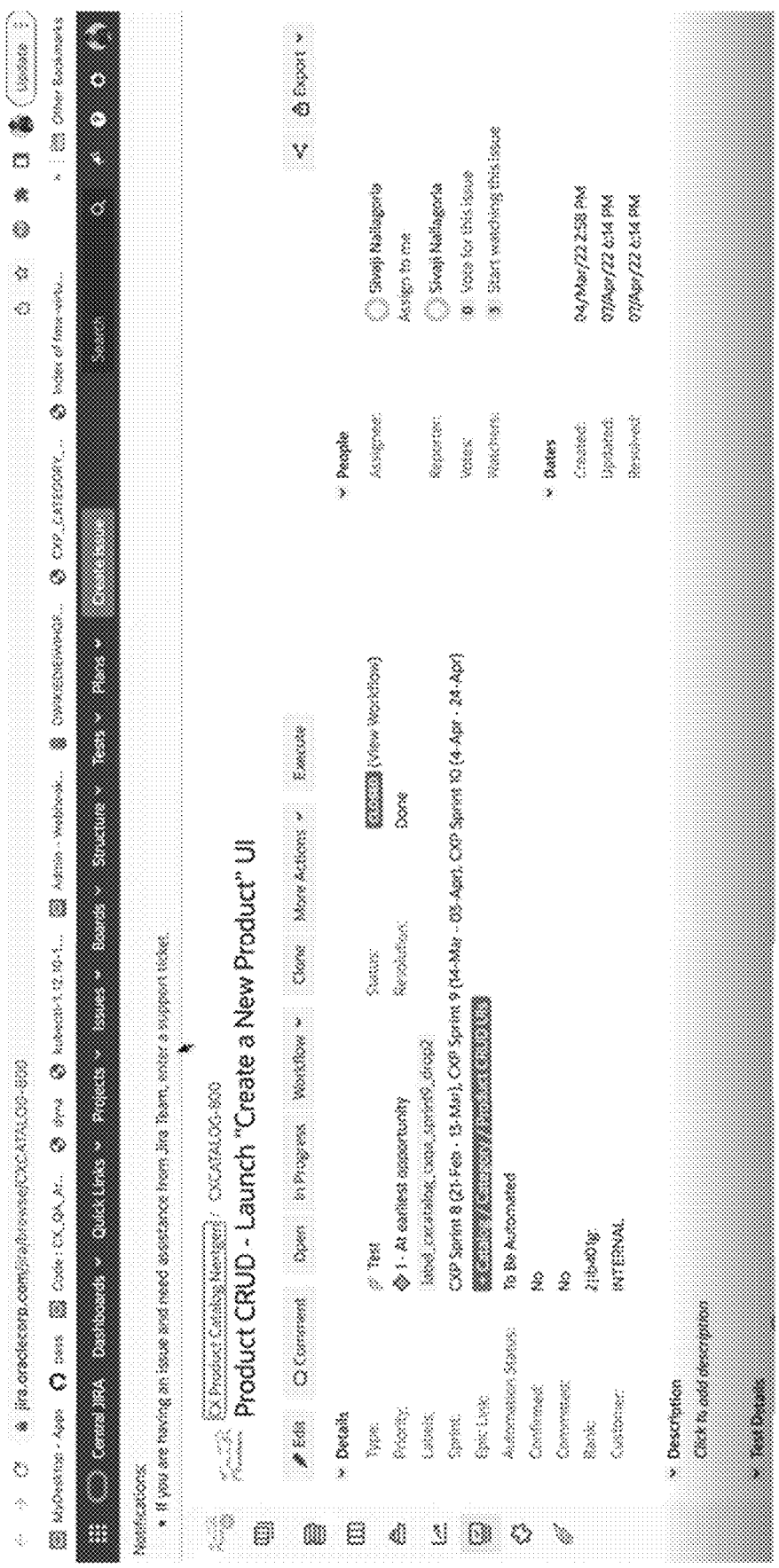
FIG. 3D is a screenshot of an example user interface that includes details about a selected test case, in an embodiment.

Each test case identifier may include a link (e.g., a URL) that, if selected, causes a new user interface or new window to be presented, such as in a web browser, and that includes information about the test case. Such information may be provided by a different software tool that is separate from the QD. FIG. 3D is a screenshot of an example user interface 390 that includes details about a selected test case.

Figure 3E:
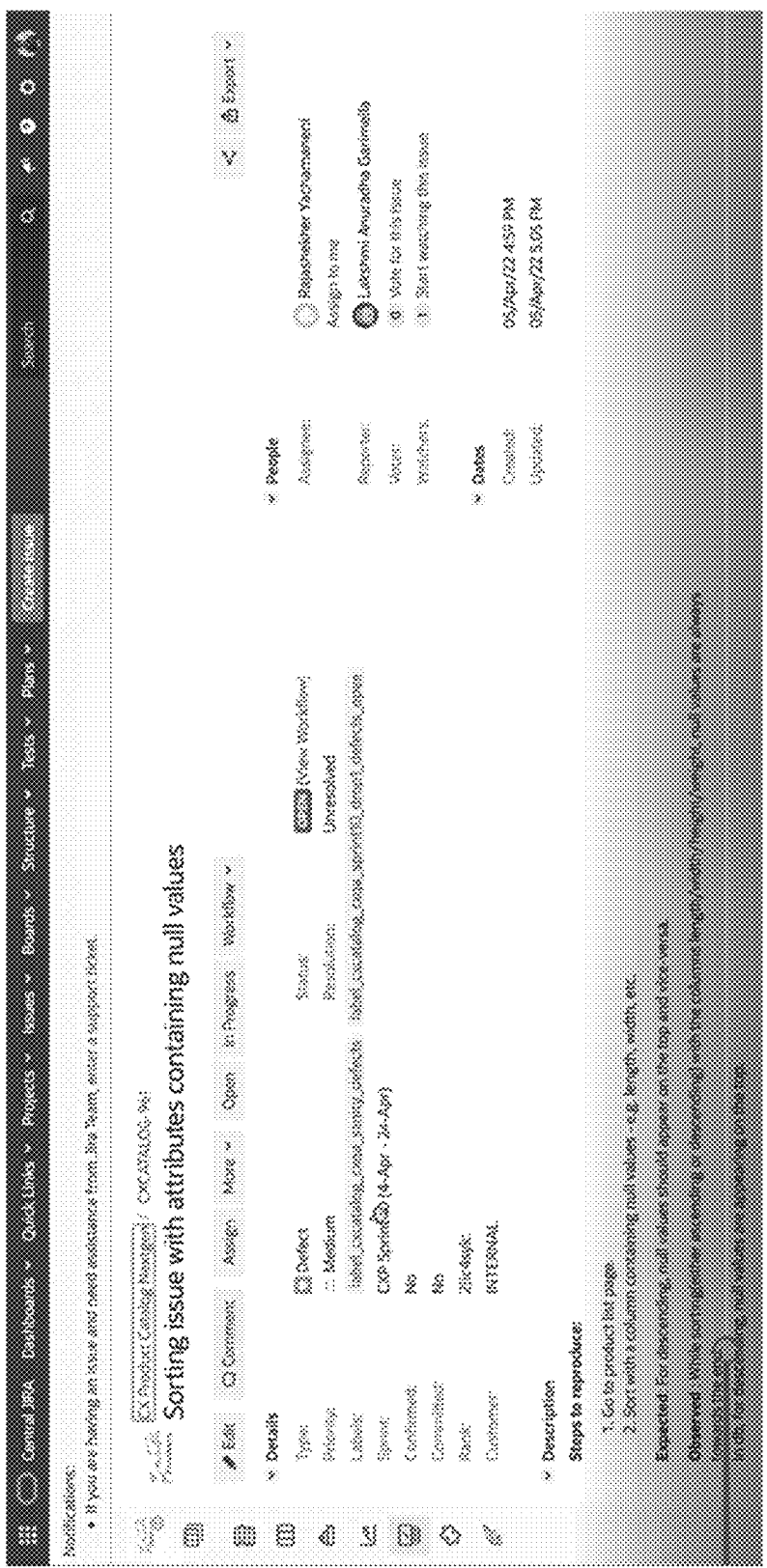
FIG. 3E is a screenshot of an example user interface that includes details about a selected bug, in an embodiment.

If there is a bug (also referred to as an "error" or "defect") associated with one of the test cases, then a bug identifier is included in the corresponding row. The bug identifier includes a link that, if selected, cases a new user interface or new window to be presented that includes information about the bug that is found. FIG. 3E is a screenshot of an example user interface 392 that includes details about a selected bug. In this example, both user interface 390 and user interface 392 are webpages that are presented in a web browser and that are provided by a third-party tool that is separate from QD.

User interface 350 also includes filter criteria 370 that filters the data that is found in table 360. Originally, table 360 may include information about all test cases pertaining to all builds of a software project. Alternatively, table 360 may originally contain only information pertaining to default filter criteria, such as default filter criteria that selects test case information about the most recent build. Filter criteria 370 includes a sprint selection option 372, drop selection option 374, status selection option 376, and a reset filter option 378. Selecting a particular sprint indicated when sprint selection option 372 is selected causes table 360 to be updated to only include information about test cases that were involved during that sprint, which may include multiple drops. Similarly, selecting a particular drop indicated when drop selection option 374 is selected causes table 360 to be updated to only include information about test cases that were involved during the selected drop (e.g., Drop 2) and a selected sprint.

Status selection option 376 allows a user to (a) select a single status in order to view only test cases with the selected status or (b) select an "All Status" option that allows the user to view test cases of any status (e.g., pass, fail, WIP, or blocked), as long as the test cases also match any other filter or search criteria that has been entered or selected. Selection of reset filter option 378 resets all the filters to default settings, such as "All Sprints," "All Drops," and "All Status."

User interface 350 also includes search options 380 that allows a user to view only test cases with the entered text data. Search options 380 include test case ID option 382, test case description option 384, and search bug option 386. For example, a user may enter text in test case ID option 382 and, in response, the QD searches the data in table 360 for test cases whose test case IDs match the entered text. If the text is the entirety of a test case ID, then the QD updates table 360 include only a single row that matches the test case ID. If the text is a portion of a test case ID, then the text may match multiple test case IDs and, consequently, the QD updates table 360 to include information about the corresponding multiple test cases.

Similarly, a user may enter text in test case description option 384 and, in response, the QD searches the data in table 360 for test cases whose descriptions match the entered text. Also, a user may enter text in search bug option 386 and, in response, the QD searches the data in table 360 for test cases whose bug IDs match the entered text.

Defects

Defects are errors in software code that are discovered by software developers and logged into a defect reporting and tracking system, which may be a third-party computer system. An example of such a system is JIRA™. The QD uses one or more APIs (e.g., REST APIs) to fetch information on defects found and, optionally, test cases run. The APIs retrieve raw defect data and the QD preserves links to defect pages so that the defect details are available to a user of the QD.

Figure 4A:
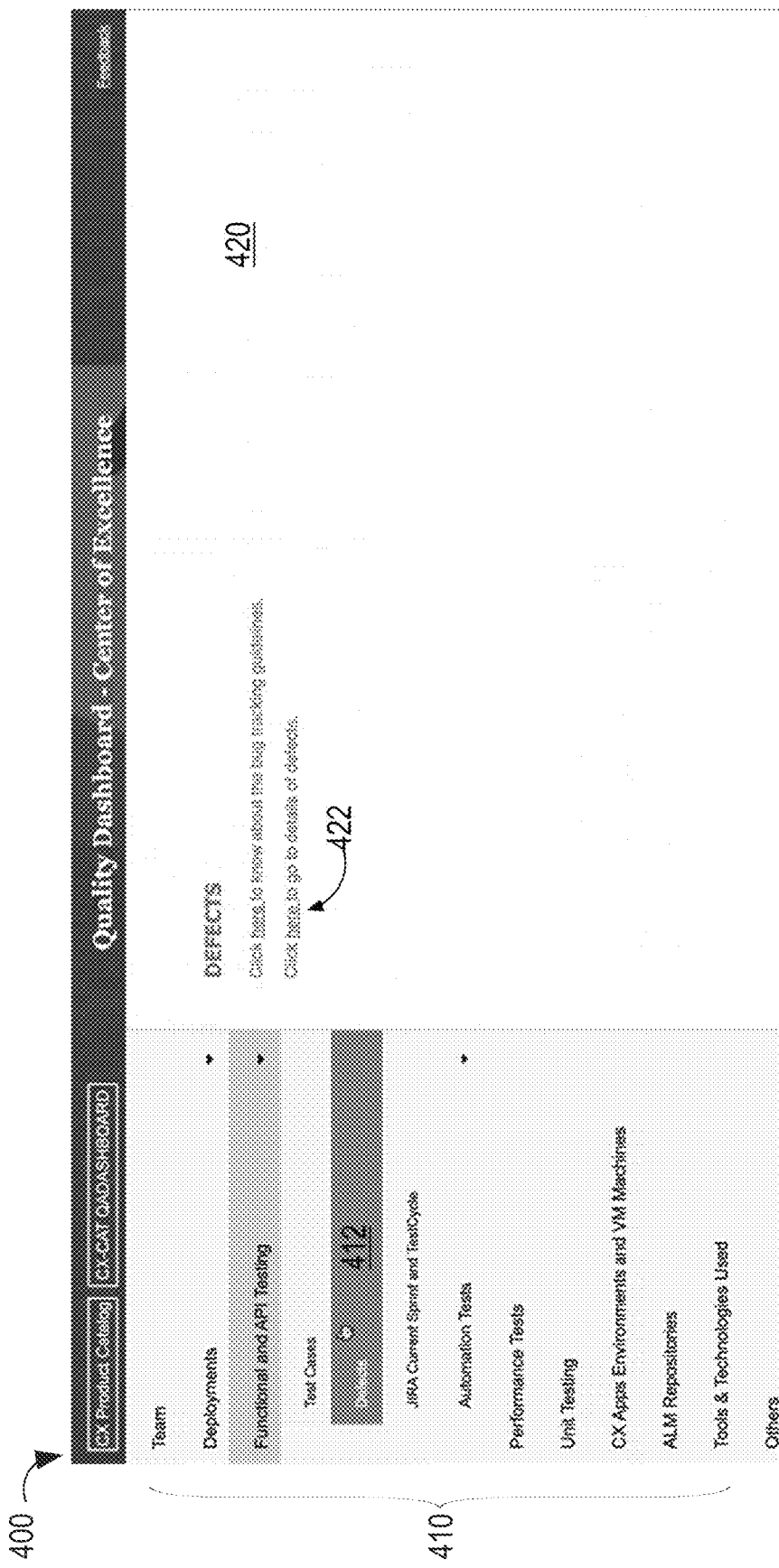

FIG. 4A is a screenshot of an example user interface 400 provided by the QD for navigating defect information, in an embodiment. User interface 400 includes a navigation panel 410, similar to navigation panel 310, except that defect option 412 is selected. Main panel 420 includes a link 422 to view information about specific defects that were discovered across one or more builds of the software project.

Figure 4B:
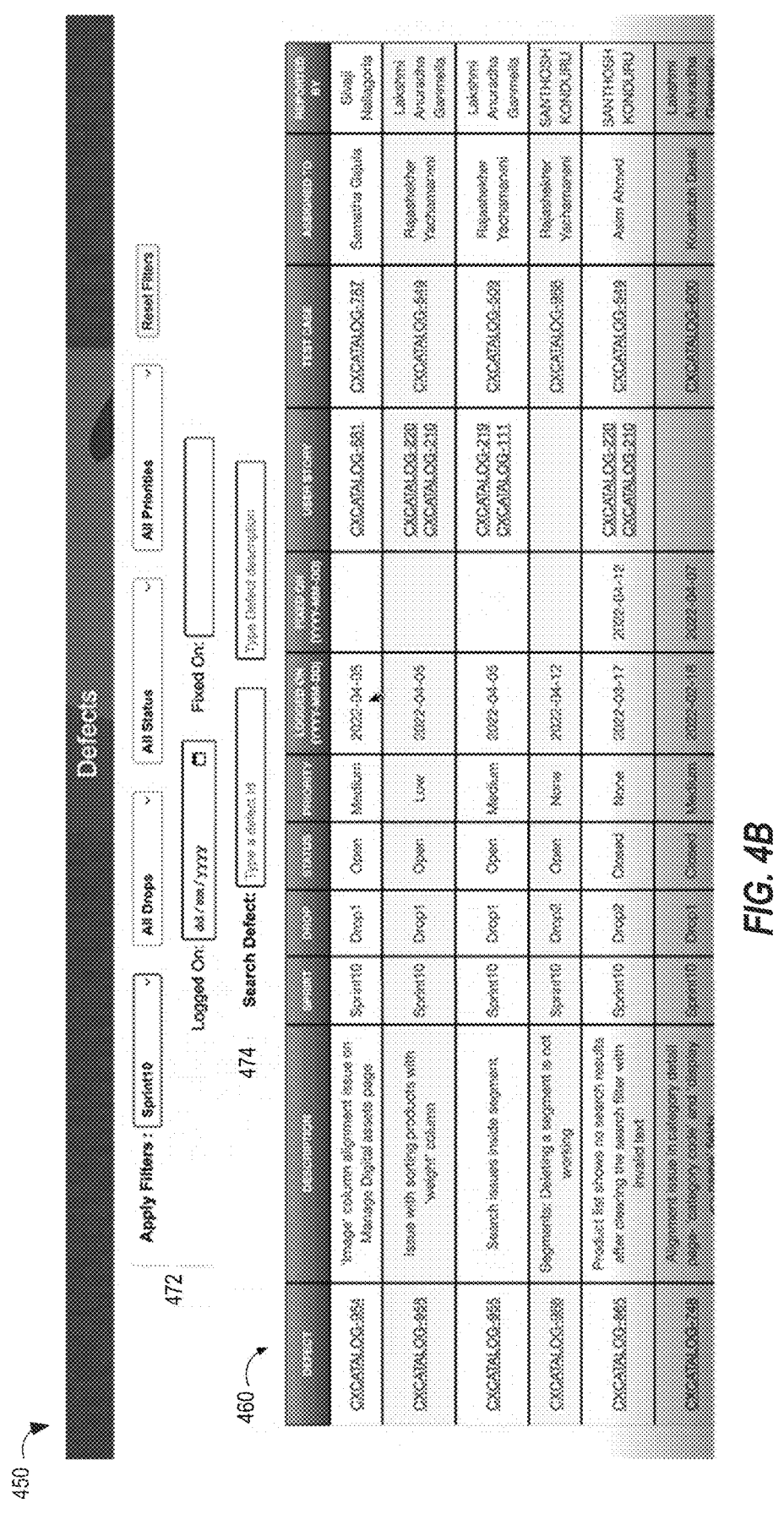

FIG. 4B is a screenshot of user interface 450 that lists details about multiple defects that were discovered. In this example, user interface 450 comprises a table 460, where each row corresponds to a different defect and columns include a defect identifier, a description of the defect, a sprint identifier, a drop identifier, a status of the defect (e.g., open or closed), a priority of the defect (e.g., none, low, medium, high), a date on which the defect was logged or reported, a date on which the defect was fixed (if fixed), a user story of the defect, a test case identifier of a test case in which the defect appeared, names of persons to whom the defect is assigned for fixing or resolving, and names of persons who reported the defect. A defect may be associated with multiple user stories and multiple test cases. There are many benefits to be able to view defects in this holistic manner rather than individually. For example, by looking at the logged on and fixed on dates, a manager can see how long it took to fix a defect and which defects have not yet been fixed. There may be an individual that is common to defects that have not yet been fixed. Thus, identifying such individuals may be performed much easier than traversing individual defects.

Similar to user interface 350, user interface 450 includes filter options 472 and search options 474 to filter the defects in table 460. Regarding filter options 472, a user may select a particular sprint or all sprints, a particular drop or all drops, defects with a particular status or defects with any status, defects with a particular priority or defects with any priority. Other types of filters include date filters. For example, a user may enter or specify a date in the logged on date field and, in response, QD updates table 460 to include only defects that were logged on that specific date (or in a date range if the user specifies a date range). Similarly, a user may enter or specify a date in the fixed on date field and, in response, the QD updates table 460 to include only defects that were fixed on that specific date (or in a date range if the user specifies a date range).

Regarding search options 474, a user may enter (or specify), in a defect identifier field, text that includes at least a portion of a defect identifier and, in response, the QD updates table 460 to include only defects whose defect identifiers match the entered text. Lastly, a user may enter, in a defect description field, text that includes a description (or a portion thereof) and, in response, the QD updates table 460 to include only defects whose defect descriptions match the entered text.

Figure 4C:
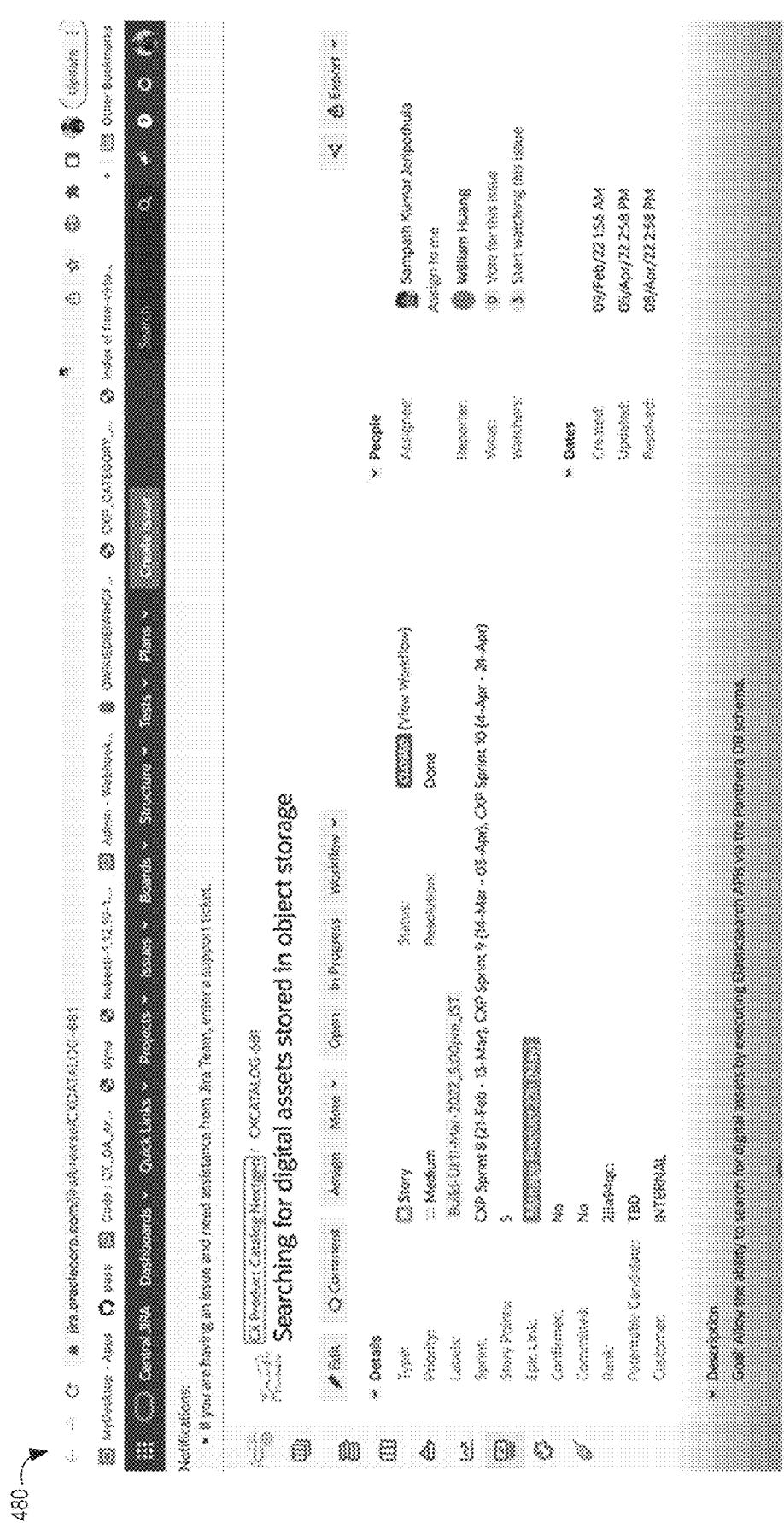
FIG. 4C is a screenshot of an example user interface that contains information about a user story, in an embodiment.

User selection of a user story identifier (which is associated with a link or URL) causes a new user interface or a new window to be displayed, such as in a web browser. The new user interface may be provided by a third-party service and contains information about the user story identified by the user story identifier. A user story is a requirement specification. FIG. 4C is a screenshot of an example user interface that contains information about a user story and that is provided by a software tool that is separate from the QD.

Similarly, user selection of a defect identifier (which is associated with a link or URL) causes a new user interface or a new window to be displayed. Again, the new user interface may be provided by a third-party service and contains information about the defect identified by the defect identifier, such as sprint and build information and other the data that allows a user to quickly correlate a user story to the test case and to the sprint. From a management point of view, a user of the QD has a unique view into a sprint, where the user can see if defects were found, who found the defects, with which test case and user story the defects are associated, all in real-time.

Figure 4D:
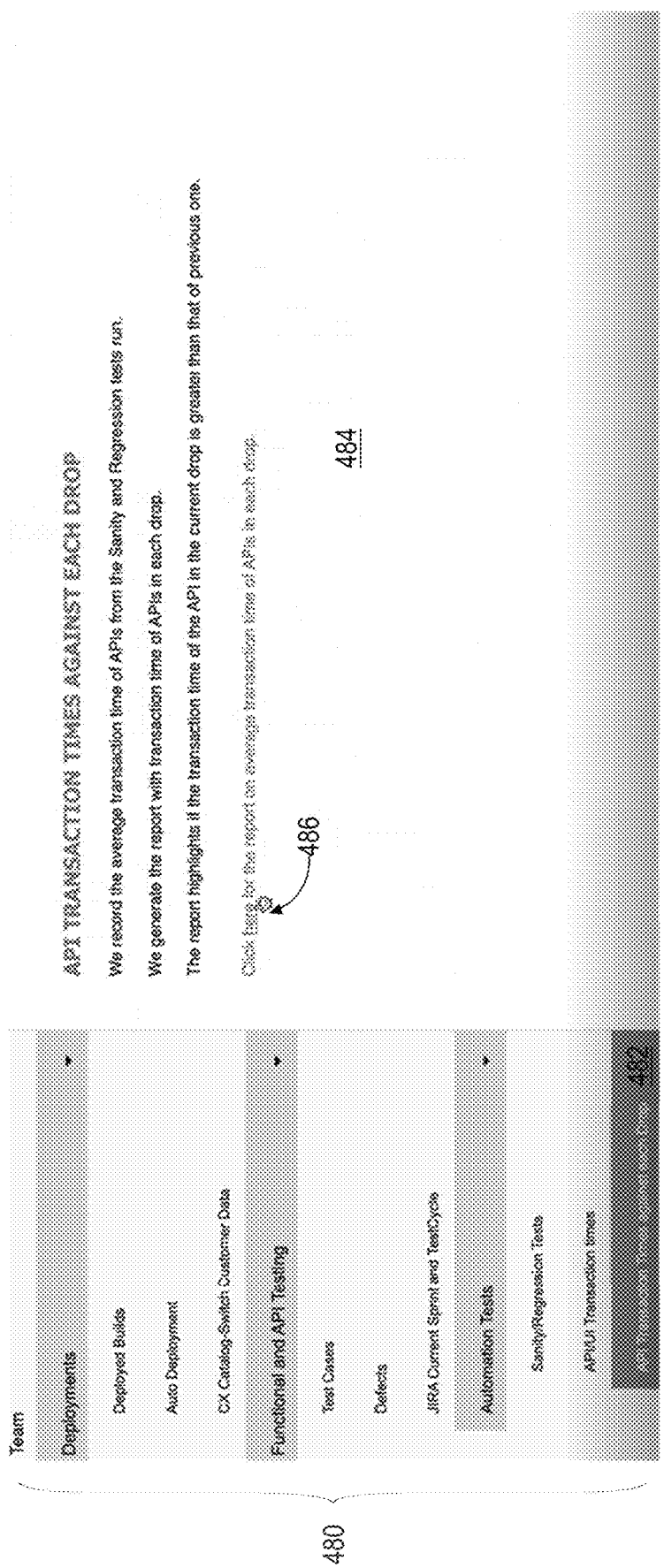
FIG. 4D is a screenshot of an example user interface that is presented when an API transaction times option is selected in a navigation panel, in an embodiment.

FIG. 4D is a screenshot of an example user interface that is presented when an API transaction times option 482 is selected in a navigation panel 480 (which is similar to navigational panel 210), in an embodiment. Main page 484 is updated to include link 486 that, when selected, causes the QD to generate and present an example user interface 490, as depicted in FIG. 4E. User interface 490 includes information about different API calls that a software build makes when executed. In this example, table 492 lists nine API calls and, for each API call, a request type (i.e., POST, GET, PATCH), an endpoint, and a name of an API call, where the name includes a link to a description of the API call. Below table 492, user interface 490 includes a table for each API call on a per-build basis. For example, for the Create Catalog API, table 494 identifies a build (with a combination of a sprint and a drop) and a transaction time (in milliseconds) of that API when the software build made that call. Table 494 indicates that the transaction time of the API increased from one build to another.

Performance Tests

Figure 5A:
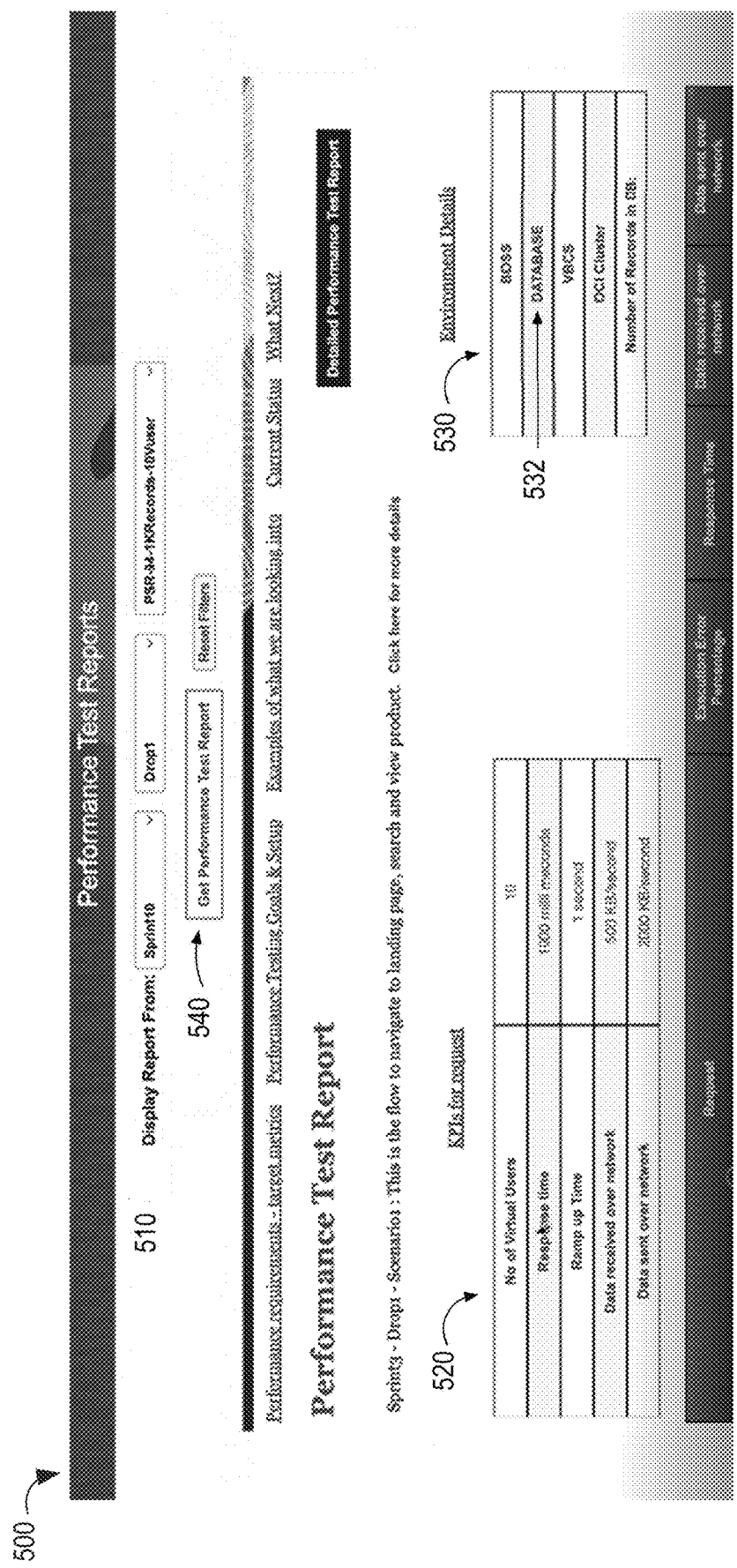
FIGS. 5A-5B is a screenshot of an example user interface that presents results of a performance test pertaining to a particular build of a software project, in an embodiment.

A performance test of a software build is a test that measures one or more performance attributes, such as time for a process to complete or a request (or call) to be performed, or an amount of data consumed as a result of a request. FIG. 5A is a screenshot of an example user interface 500 that presents results of a performance test pertaining to a particular build of a software project, in an embodiment. The results may have been generated by a software tool that is different than the QD but the results are stored in a format that is readable by the QD, either for presentation or for transformation by the QD into another format for presentation by the QD.

User interface 500 may be presented in response to selection of performance tests option 213 in FIG. 2. User interface 500 allows a user to view a report of a performance test of a particular build through build options 510 that include a drop-down menu for sprints and a drop-down menu for drops. User interface 500 also includes key performance indicators (KPIs) 520 as benchmarks to measure performance data against. In this example, KPI parameters include a number of virtual users, a response time, a ramp up time, an amount of data received over a computer network, and an amount of data sent over a computer network. Values for the KPI parameters are provided in the adjacent column.

User interface 500 also includes environment table 530 that indicates one or more environments in which a software build is run and tested. In this example, three of the environments include a database, a visual builder cloud service (VBCS), and a cluster interface. The name of each environment includes a link that, when selected, provides additional information about the corresponding environment. For example, selecting the database name 532 may cause a pop-up window to be presented, which window indicates a version of a database system that hosted the software build that was tested and details about the host, such as IP address, amount of RAM, and disk size.

Figure 5B:
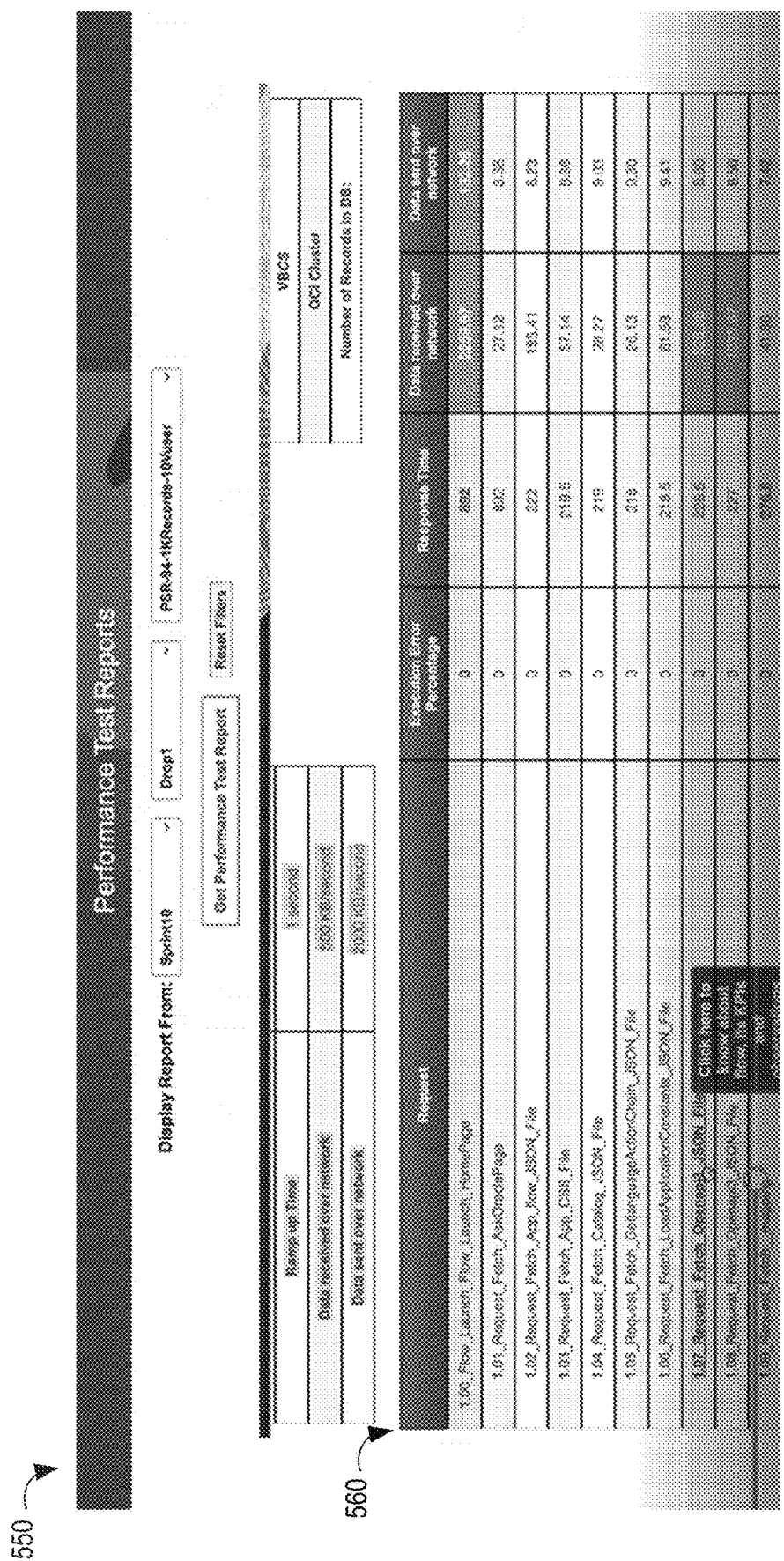

User interface 500 also includes a get test report button 540 that, when selected, causes a table of performance data to be presented, which is depicted in user interface 550 of FIG. 5B.

User interface 550 includes a performance table 560 that lists multiple requests and, for each request, an execution error percentage of the request, a response time of the request, an amount of data received over a computer network as a result of the request, and an amount of data sent over a computer network as a result of the request. If a value in one of the number data type columns exceeds a corresponding KPI parameter, then QD may cause that value to be highlighted in some way, such as through font color, background color, font size, and other font-related effects (e.g., bold, italicize).

User selection of one of the request names in the left-most column of performance table 560 causes additional request-specific information to be displayed, whether in (a) an updated user interface that replaces performance table 560 or (b) a pop-up window that overlays performance table 560. Examples of the additional request-specific information include a description of the request, a size of the data that was requested, a URL of the request, a method of the request (e.g., GET, POST, PUT, PATCH, DELETE), a status code of the request (e.g., 200 OK or 404 ERROR), and a link to a file that contains a response of the request. User selection of the link causes the file to be opened and contents of the file to be presented on a screen of the computer device on which the QD (or a portion thereof) is executing.

A flow is a series of requests. User selection of a name of a flow (e.g., "1.00_Flow_Launch_Flow_Launch_HomePage") listed in performance table 560 causes information about the flow (and one or more requests in the flow) to be retrieved and presented, either in a new window or in a pop-up window. Examples of flow-related information that may be presented in a new window or pop-up window include a listing of requests in the selected flow whose response times exceed the KPI for response time and a list of requests in the selected flow whose data received per second exceeds the KPI for data received.

Environments

Another type of information that the QD allows users to view is environments data 152, which identifies one or more applications upon which a software project depends (e.g., calls) during execution. For example, environments data 152 includes a uniform resource locator (URL) for each application, where if the URL is selected by a user of the user interface, information about the corresponding application is presented, whether in the user interface or in another interface, such as a web browser. The applications that are listed in environments data 152 may be provided by a third-party. Thus, while the applications may be ancillary to the software project, the applications may be required for the software project to run or execute properly. Information in environments data 152 may be generated or updated based on code that is run regularly (e.g., daily). The code may be independent of the QD, but may be called by the QD through an API.

FIG. 6 is a screenshot of an example user interface 600 provided by the QD for viewing information about applications upon which a software project depends, in an embodiment. User interface 600 may be generated and displayed in response to user selection of environments option 215 in navigation panel 210 of FIG. 2 (or in response to one or more intermediate user interfaces that are linked to by user interface 200). The table in user interface 600 lists multiple applications and, for each application, an application type, a product name, an owner, a URL, an Up/Down status, and Login credentials (e.g., username and password).

ALM Repositories

Another type of information that is available through the QD is application lifecycle management (ALM) data, which includes information about artifacts related to a software project. Example artifacts include test cases, test code, code for deployment, code for fetching defects from a third-party service, and documentation of different code. The information about artifacts may also include links to repositories where the artifacts may be stored or otherwise found.

Figure 7:
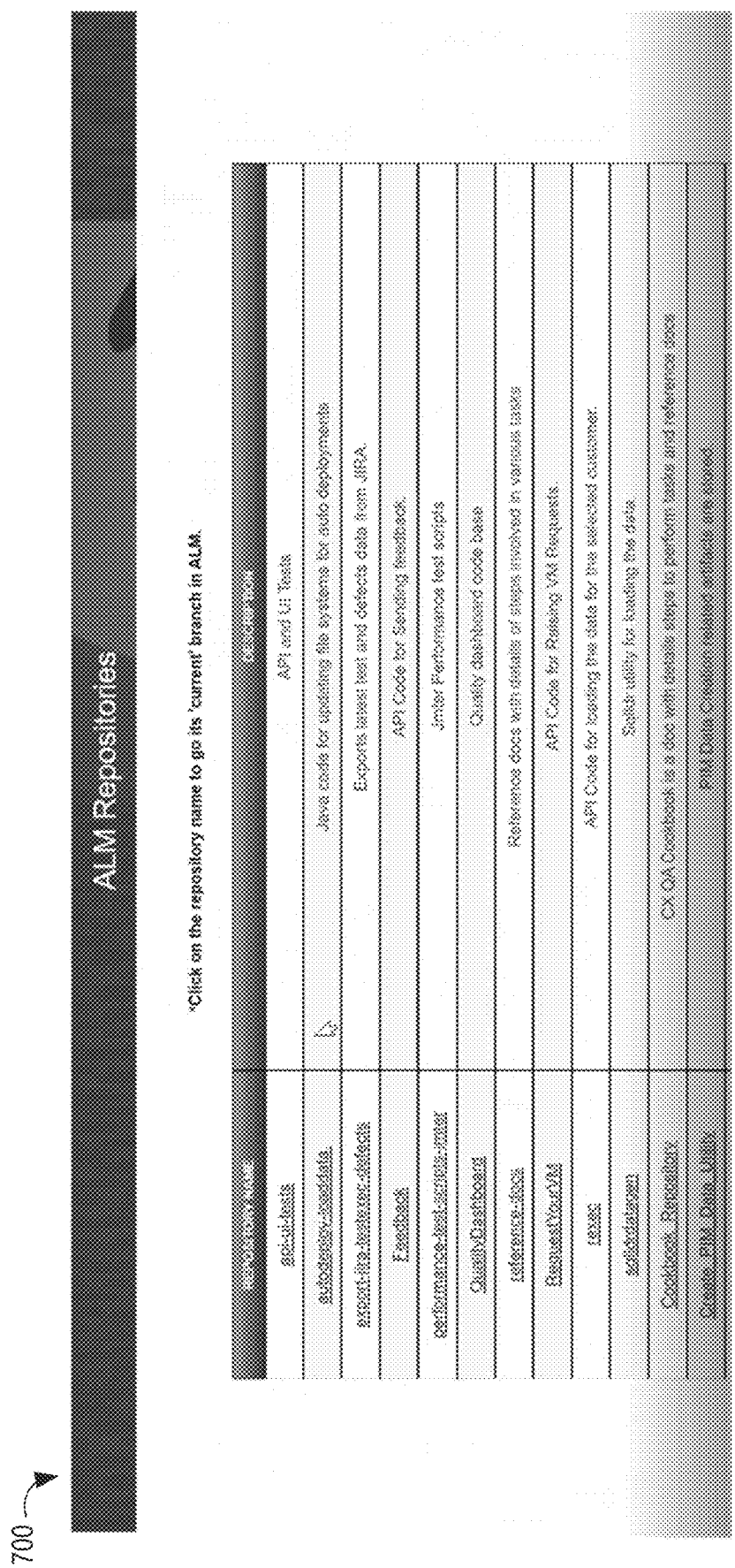
FIG. 7 is a screenshot of an example user interface provided by the QD for viewing information about artifacts related to the ALM of a software project, in an embodiment.

FIG. 7 is a screenshot of an example user interface 700 provided by the QD for viewing information about artifacts related to ALM of a software project, in an embodiment. User interface 700 may be generated and displayed in response to user selection of ALM repositories option 216 in navigation panel 210 of FIG. 2 (or in response to one or more intermediate user interfaces that are linked to by user interface 200). The table in user interface 700 lists multiple artifacts and, for each artifact, (1) a link to a (e.g., Git) repository that contains the artifact and (2) a description of the artifact.

Process Overview

Figure 8:
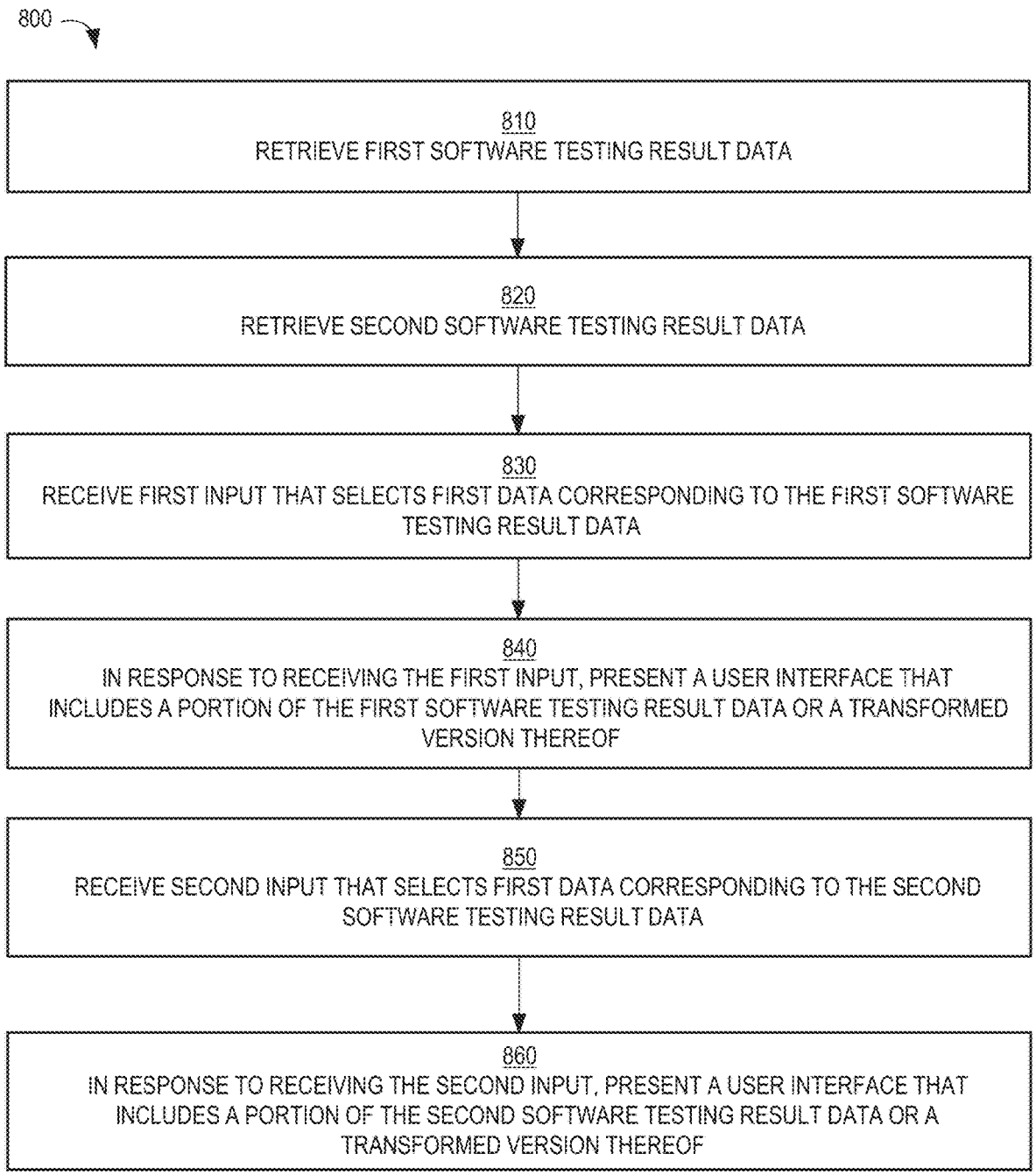
FIG. 8 is a flow diagram that depicts an example process for providing navigatable insight into the status of a software project, in an embodiment.

FIG. 8 is a flow diagram that depicts an example process 800 for providing navigable insight into the status of a software project, in an embodiment. Process 800 may be performed by a user interface tool, or the Quality Dashboard.

At block 810, first software testing result data is retrieved. The first software testing result data was generated based on a first type of software test of a software build. For example, the first type of software test may be a unit test, a functional test, or a performance test. Block 810 may have been preceded by the user interface tool triggering a QA run cycle that triggers multiple types of tests of the software build. Block 810 may involve retrieving the first software testing data from a first (e.g., remote) storage location and storing the first software testing data in a second storage location (e.g., local to the user interface tool). This process may also involve one or more transformations on the first software testing data to generate a transformed version thereof that is in a different format (e.g., JSON instead of CSV or table data instead of CSV).

At block 820, second software testing result data is retrieved. The second software testing result data was generated based on a second type of software test, of the software build, that is different than the first type of software test. For example, the first type of software test may have been a unit test while the second type of software test is a performance test. Block 820 may be similar to block 810 in that one or more transformations on the second software testing result data may be performed.

At block 830, first input that selects first data corresponding to the first software testing result data is received. For example, the first data may be a link and the first data may be selection of the link (e.g., through a cursor control device), which causes data that is derived from the first software testing result data to be displayed on a screen of a computing device.

At block 840, in response to receiving the first input, a user interface is presented that includes a portion of the first software testing result data or a transformed version thereof. For example, the user interface tool, in response to selection of a link, identifies a portion of software testing result data that is stored in JSON format. This identification may be based on filter and/or search criteria that a user of the user interface tool provided. Thus, a strict subset of the JSON data is retrieved and used to generate a user interface with one or more user interface objects, such as a table with multiple columns and rows.

Blocks 850-860 are similar to blocks 830-840. One difference is that the second software testing result data is involved instead of the first software testing result data. Also, when selecting second data that corresponds to the second software testing result data, there may be one or more intermediate user inputs before a second user interface is presented that includes a portion of the second software testing result data or a transformed version thereof. Also, the second user interface may replace the first user interface so that both user interfaces are not displayed concurrently.

Within each user interface, software testing result data (whether originally generated by a software tool that performed the test or based on one or more transformations) may be filtered and searched based on different criteria, depending on the type of software test that was performed to generate the software testing result data. For example, some testing result data may be filtered based on build identifier, sprint identifier, and/or drop identifier.

In the above manner, the user interface tool offers specific value to individuals based on their role (e.g., developers, managers, VPs, executives) in the software development process. Additionally, with a 360-degree view of the QA run cycle with the generated reports, the user interface tool acts as a one-stop destination that allows anyone the ability to view progress (across multiple dimensions) of a software project over time or just the latest builds or to view the minute details of a specific bug or defect. Project teams can use the user interface tool in day-to-day work since it acts as an extension of office productivity and communications tools, but one that is specifically designed and targeted for the demands of their information environment.

The user interface tool enables the comparison of current build health with previous ones. Thus, a software development team can retrospect on what went well, what did not go well, and can plan on areas of improvement.

The user interface tool also enables the identification of root causes of failures pertaining to a functional area, such as product management, order management, and payment module. Therefore, project team members can focus more on functional areas which are more prone to failures and can make plans to fix them at the early stages. The user interface tool makes it effortless to look into information related to test runs of a build.

Quicklinks

In an embodiment, the QD provides one or more "quicklinks" on a homepage to common reports. Such quicklinks may be hard-coded, meaning a user or administrator of the QD specified those links, knowing that the corresponding reports would be accessed frequently. Additionally or alternatively, quicklinks may be soft-coded, meaning that the QD tracks which reports are generated most frequently and with which filter and/or search criteria. For example, the QD determines that performance tests of the latest build are requested most often and, therefore, the QD dynamically generates a link to performance test results of the latest build and includes the link on a homepage of the QD.

In a related embodiment, the QD includes a chat bot that recognizes keywords in text data (which may be entered by a user or may be translated into text from audio data) and includes one or more links to reports that the chat bot recognizes. For example, the chat bot may recognize "defects" and "latest build" and, as a result, displays (in a chat bot display box) a selectable link to a defects user interface where the filter criteria already specifies the latest build identifier (or combination of latest sprint identifier and latest drop identifier for that sprint) and, therefore, the table that is presented includes defects that were discovered in the latest build.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 9:
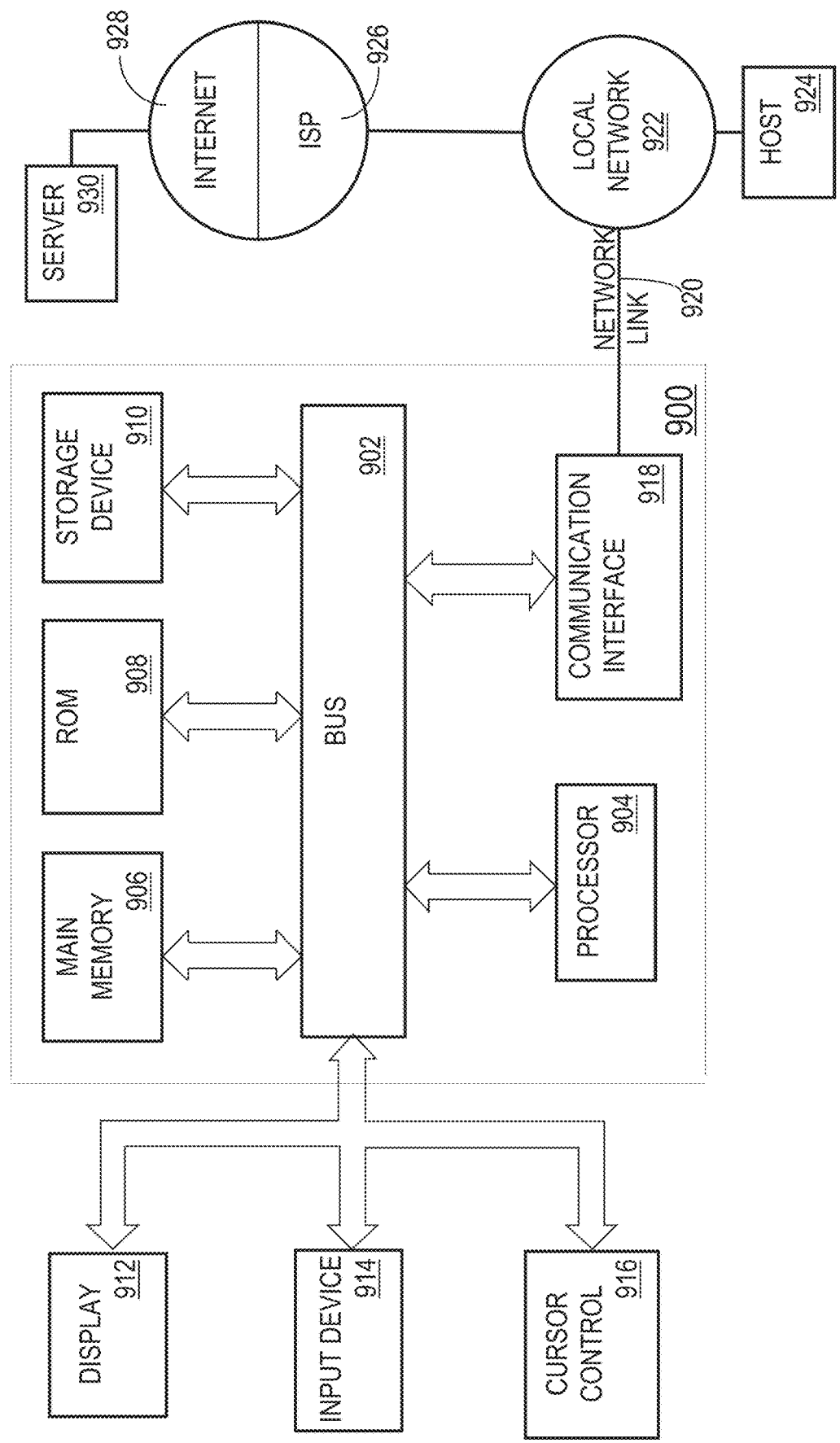
FIG. 9 is a block diagram that illustrates a computer system upon which an embodiment of the invention may be implemented.

For example, FIG. 9 is a block diagram that illustrates a computer system 900 upon which an embodiment of the invention may be implemented. Computer system 900 includes a bus 902 or other communication mechanism for communicating information, and a hardware processor 904 coupled with bus 902 for processing information. Hardware processor 904 may be, for example, a general purpose microprocessor.

Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Such instructions, when stored in non-transitory storage media accessible to processor 904, render computer system 900 into a special-purpose machine that is customized to perform the operations specified in the instructions.

Computer system 900 further includes a read only memory (ROM) 908 or other static storage device coupled to bus 902 for storing static information and instructions for processor 904. A storage device 910, such as a magnetic disk, optical disk, or solid-state drive is provided and coupled to bus 902 for storing information and instructions.

Computer system 900 may be coupled via bus 902 to a display 912, such as a cathode ray tube (CRT), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

Computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor 904 executing one or more sequences of one or more instructions contained in main memory 906. Such instructions may be read into main memory 906 from another storage medium, such as storage device 910. Execution of the sequences of instructions contained in main memory 906 causes processor 904 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 910. Volatile media includes dynamic memory, such as main memory 906. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid-state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic, or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the worldwide packet data communication network now commonly referred to as the "Internet" 928. Local network 922 and Internet 928 both use electrical, electromagnetic, or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution.

Software Overview

Figure 10:
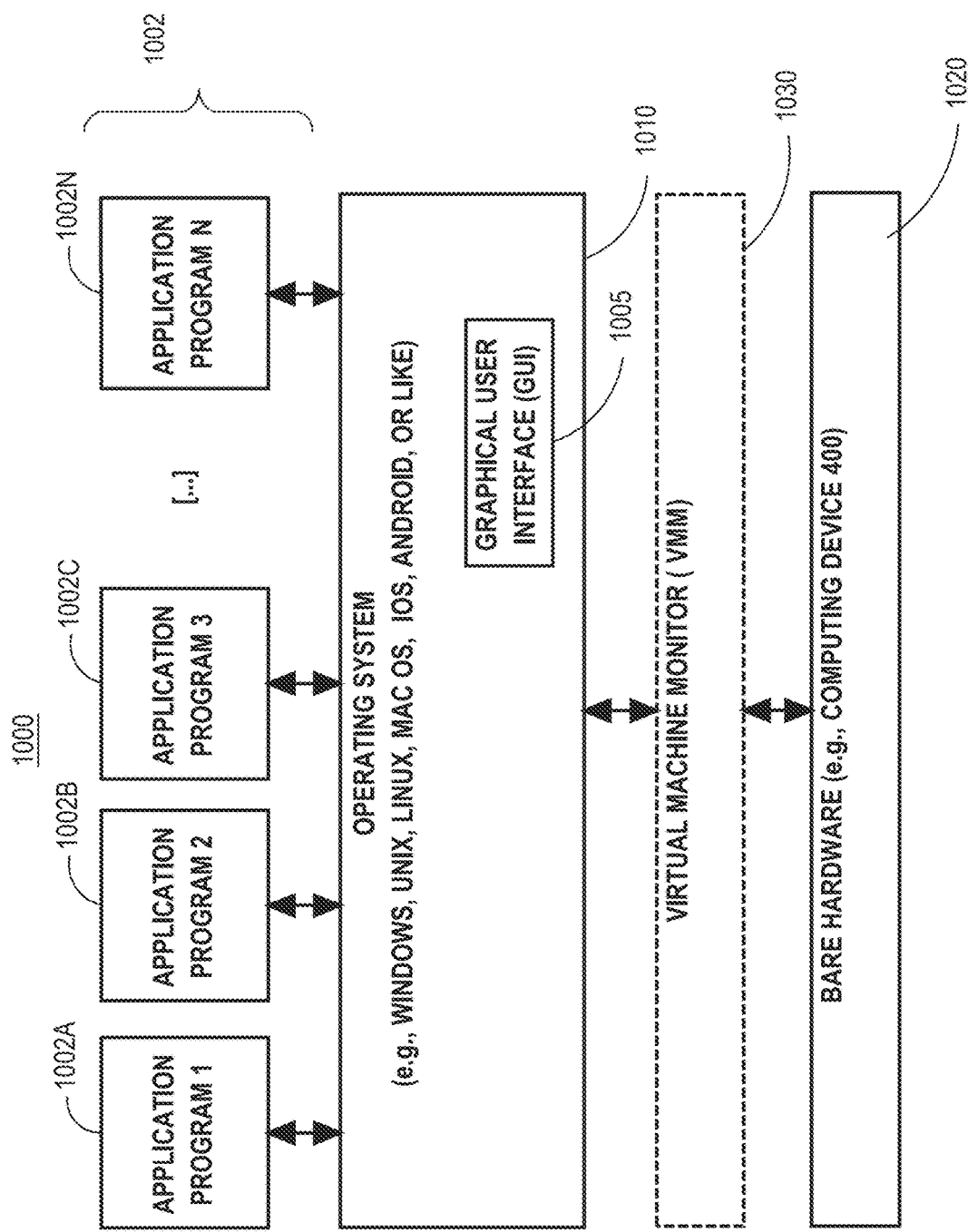
FIG. 10 is a block diagram of a basic software system that may be employed for controlling the operation of the computer system.

FIG. 10 is a block diagram of a basic software system 1000 that may be employed for controlling the operation of computer system 900. Software system 1000 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 1000 is provided for directing the operation of computer system 900. Software system 1000, which may be stored in system memory (RAM) 906 and on fixed storage (e.g., hard disk or flash memory) 910, includes a kernel or operating system (OS) 1010.

The OS 1010 manages low-level aspects of computer operation, including managing execution of processes, memory allocation, file input and output (I/O), and device I/O. One or more application programs, represented as 1002A, 1002B, 1002C . . . 1002N, may be "loaded" (e.g., transferred from fixed storage 910 into memory 906) for execution by the system 1000. The applications or other software intended for use on computer system 900 may also be stored as a set of downloadable computer-executable instructions, for example, for downloading and installation from an Internet location (e.g., a Web server, an app store, or other online service).

Software system 1000 includes a graphical user interface (GUI) 1015, for receiving user commands and data in a graphical (e.g., "point-and-click" or "touch gesture") fashion. These inputs, in turn, may be acted upon by the system 1000 in accordance with instructions from operating system 1010 and/or application(s) 1002. The GUI 1015 also serves to display the results of operation from the OS 1010 and application(s) 1002, whereupon the user may supply additional inputs or terminate the session (e.g., log off).

OS 1010 can execute directly on the bare hardware 1020 (e.g., processor(s) 904) of computer system 900. Alternatively, a hypervisor or virtual machine monitor (VMM) 1030 may be interposed between the bare hardware 1020 and the OS 1010. In this configuration, VMM 1030 acts as a software "cushion" or virtualization layer between the OS 1010 and the bare hardware 1020 of the computer system 900.

VMM 1030 instantiates and runs one or more virtual machine instances ("guest machines"). Each guest machine comprises a "guest" operating system, such as OS 1010, and one or more applications, such as application(s) 1002, designed to execute on the guest operating system. The VMM 1030 presents the guest operating systems with a virtual operating platform and manages the execution of the guest operating systems.

In some instances, the VMM 1030 may allow a guest operating system to run as if it is running on the bare hardware 1020 of computer system 900 directly. In these instances, the same version of the guest operating system configured to execute on the bare hardware 1020 directly may also execute on VMM 1030 without modification or reconfiguration. In other words, VMM 1030 may provide full hardware and CPU virtualization to a guest operating system in some instances.

In other instances, a guest operating system may be specially designed or configured to execute on VMM 1030 for efficiency. In these instances, the guest operating system is "aware" that it executes on a virtual machine monitor. In other words, VMM 1030 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

The above-described basic computer hardware and software is presented for purposes of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   executing a user interface tool on a computing device;
   initiating, by the user interface tool, a quality assurance run cycle that involves (1) a build process that, when completed, results in a software build and (2) a plurality of software tests of the software build;
   retrieving, by the user interface tool, first software testing result data that was generated based on a first software test of the plurality of software tests of the software build;
   retrieving, by a user interface tool, second software testing result data that was generated based on a second software test of the plurality of software tests of the software build;
   receiving, by the user interface tool, first input that selects the first software testing result data;
   in response to receiving the first input, updating, on a screen of a computing device, a user interface of the user interface tool to present first data that is based on a portion of the first software testing result data;
   receiving, by the user interface tool, second input that selects the second software testing result data;
   in response to receiving the second input, updating the user interface of the user interface tool to present second data that is based on a portion of the second software testing result data;
   retrieving and display, by the user interface tool, defect data about a plurality of defects associated with one or more software builds that includes the software build;
   wherein the defect data includes, for each defect in the plurality of defects, two or more of:
      a description of said each defect, a status of said each defect, a build in which said each defect was found, a user specification that corresponds to said each defect, a unit test that triggered said defect, an individual to which said each defect is assigned, or a priority of said each defect;
   wherein the method is performed by one or more computing devices.

2. The method of claim 1, wherein the first software test is a first type of software test and the second software test is a second type of software test that is different than the first type of software test.

3. The method of claim 2, wherein:
   the first type of software test is one of a unit test, a functional automation test, or a performance test;
   the second type of software test is another one of the unit test, the functional automation test, or the performance test.

4. The method of claim 1, wherein the user interface includes one or more user interface controls, further comprising:
   receiving, through the user interface, particular input that indicates selection of one or more filter criteria;
   in response to receiving the particular input, updating the user interface to present third data that is based on a second portion of the first software testing result data.

5. The method of claim 4, wherein:
   the one or more filter criteria indicates a particular build from a plurality of builds;
   the second portion of the first software testing result data corresponds to the particular build and not to any other build of the plurality of builds.

6. The method of claim 1, wherein:
   the first software test is a performance test;
   the portion of the first software testing result data indicates names of a plurality of function calls and a performance data item for each function call in the plurality of function calls;
   updating the user interface to present the first data that is based on the portion of the first software testing result data comprises:

for each of a plurality of performance data items in the portion:
  identifying a key performance indicator that corresponds to said each performance data item;
  comparing said each performance data item to the key performance indicator;
  highlighting the performance data item in the user interface when said each performance data item exceeds the key performance indicator,
wherein a particular performance data item in the plurality of performance data items exceeds the key performance indicator that corresponds to the particular performance data item.

7. The method of claim 6, further comprising:
in response to particular input that selects one of the names or one of the plurality of performance data items, updating the user interface to present multiple details of the corresponding function call.

8. The method of claim 1, wherein:
the first software test is a unit test;
the portion of the first software testing result data includes result data from a plurality of unit tests;
the portion indicates, for each unit test of the plurality of unit tests, a description of said each unit test, a status of said each unit test, and a build indicator that indicates a build against which said each unit test was run.

9. The method of claim 1, further comprising: in response to receiving third input that selects a defect of the plurality of defects, causing a web page to be presented that includes details about the defect and that is from a tool that is separate from the user interface tool.

10. The method of claim 1, further comprising:
in response to receiving third input that selects a requirements specification of a defect of the plurality of defects, causing a web page to be presented that includes details about the requirements specification and that is from a tool that is separate from the user interface tool.

11. The method of claim 1, further comprising, prior to retrieving the first and second software testing result data:
  converting, by the user interface tool, the portion of the first software testing result data, that is in a first data format, into the first data that is in a second data format that is different than the first data format;
  converting, by the user interface tool, the portion of the second software testing result data, that is in the first data format, into the second data that is in the second data format.

12. A method comprising:
executing a user interface tool on a computing device;
retrieving, by the user interface tool, first software testing result data that was generated based on a first type of software test of a software build;
retrieving, by a user interface tool, second software testing result data that was generated based on a second type of software test of the software build;
receiving, by the user interface tool, first input that selects the first software testing result data;
in response to receiving the first input, updating, on a screen of a computing device, a user interface of the user interface tool to present first data that is based on a portion of the first software testing result data;
receiving, by the user interface tool, second input that selects the second software testing result data;
in response to receiving the second input, updating the user interface of the user interface tool to present second data that is based on a portion of the second software testing result data;
the first type of software test is a unit test;
the portion of the first software testing result data includes result data from a plurality of unit tests;
the portion of the first software testing result data indicates, for each unit test of the plurality of unit tests, a description of said each unit test, a status of said each unit test, and a build indicator that indicates a build against which said each test was run;
wherein the method is performed by one or more computing devices.

13. The method of claim 12, wherein the user interface includes one or more user interface controls, wherein the instructions, when executed by the one or more processors, further cause:
  receiving, through the user interface, particular input that indicates selection of one or more filter criteria;
  in response to receiving the particular input, updating the user interface to present third data that is based on a second portion of the first software testing result data;
  wherein the one or more filter criteria indicates a particular build from a plurality of builds;
  wherein the second portion of the first software testing result data corresponds to the particular build and not to any other build of the plurality of builds.

14. The method of claim 12, further comprising:
retrieving, by the user interface tool, defect data about a plurality of defects associated with one or more software builds that includes the software build;
wherein the defect data includes, for each defect in the plurality of defects, two or more of:
  a description of said each defect, a status of said each defect, a build in which said each defect was found, a user specification that corresponds to said each defect, a unit test that triggered said defect, an individual to which said each defect is assigned, or a priority of said each defect.

15. One or more non-transitory storage media storing instructions which, when executed by one or more computing devices, cause:
  executing a user interface tool on a computing device;
  retrieving, by the user interface tool, first software testing result data that was generated based on a first type of software test of a software build, wherein the first type of software test was performed by a first software testing tool that is separate from the user interface tool;
  retrieving, by a user interface tool, second software testing result data that was generated based on a second type of software test of the software build, wherein the second type of software test was performed by a second software testing tool that is separate from the user interface tool and that is different than the first software testing tool;
  receiving, by the user interface tool, first input that selects the first software testing result data;
  in response to receiving the first input, updating, on a screen of a computing device, a user interface of the user interface tool to present first data that is based on a portion of the first software testing result data;
  receiving, by the user interface tool, second input that selects the second software testing result data;
  in response to receiving the second input, updating the user interface of the user interface tool to present second data that is based on a portion of the second software testing result data;

wherein the user interface includes one or more user interface controls;
receiving, through the one or more user interface controls of the user interface, particular input that indicates selection of one or more filter criteria,
in response to receiving the particular input, updating the user interface to present third data that is based on a second portion of the first software testing result data;
wherein the second portion of the first software testing result data corresponds to the particular build and not to any other build of the plurality of builds.

16. The one or more non-transitory storage media of claim 15, wherein:
the first type of software test is one of a unit test, a functional automation test, or a performance test;
the second type of software test is another one of the unit test, the functional automation test, or the performance test.

17. The one or more non-transitory storage media of claim 15, wherein:
the first type of software test is a performance test;
the portion of the first software testing result data indicates names of a plurality of function calls and a performance data item for each function call in the plurality of function calls;
updating the user interface to present the first data that is based on the portion of the first software testing result data comprises:
for each of a plurality of performance data items in the portion:
identifying a key performance indicator that corresponds to said each performance data item;
comparing said each performance data item to the key performance indicator;
highlighting the performance data item in the user interface when said each performance data item exceeds the key performance indicator.

18. The one or more non-transitory storage media of claim 15, wherein:
the first type of software test is a unit test;
the portion of the first software testing result data includes result data from a plurality of unit tests;
the portion indicates, for each unit test of the plurality of unit tests, a description of said each unit test, a status of said each unit test, and a build indicator that indicates a build against which said each test was run.

19. The one or more non-transitory storage media of claim 15, wherein the instructions, when executed by the one or more computing devices, further cause:
retrieving, by the user interface tool, defect data about a plurality of defects associated with one or more software builds that includes the software build;
wherein the defect data includes, for each defect in the plurality of defects, two or more of:
a description of said each defect, a status of said each defect, a build in which said each defect was found, a user specification that corresponds to said each defect, a unit test that triggered said defect, an individual to which said each defect is assigned, or a priority of said each defect.

20. The one or more non-transitory storage media of claim 15, wherein the instructions, when executed by the one or more computing devices, further cause, prior to retrieving the first and second software testing result data:
converting, by the user interface tool, the portion of the first software testing result data, that is in a first data format, into the first data that is in a second data format that is different than the first data format;
converting, by the user interface tool, the portion of the second software testing result data, that is in the first data format, into the second data that is in the second data format.

* * * * *